US012668256B2

(12) United States Patent
Wu

(10) Patent No.: US 12,668,256 B2
(45) Date of Patent: Jun. 30, 2026

(54) TRANSPARENCY AND VALIDATION OF VEHICLE LOCOMOTIVE ACTIONS

(71) Applicant: Pony.ai, Inc., Fremont, CA (US)

(72) Inventor: Zhen Wu, San Jose, CA (US)

(73) Assignee: Pony.ai, Inc., Fremont, CA (US)

( * ) Notice: Subject to any disclaimer, the term of this patent is extended or adjusted under 35 U.S.C. 154(b) by 272 days.

(21) Appl. No.: 18/513,093

(22) Filed: Nov. 17, 2023

(65) Prior Publication Data

US 2025/0162600 A1     May 22, 2025

(51) Int. Cl.
*B60W 50/038*          (2012.01)
*B60W 50/02*           (2012.01)

(52) U.S. Cl.
CPC ...... *B60W 50/038* (2013.01); *B60W 50/0225* (2013.01); *B60W 2554/4046* (2020.02); *B60W 2556/35* (2020.02)

(58) Field of Classification Search
CPC ........... B60W 50/038; B60W 50/0225; B60W 2554/4046; B60W 2556/35; B60W 2554/402; B60W 60/00186; B60W 60/001; B60W 2720/10
See application file for complete search history.

(56) References Cited

U.S. PATENT DOCUMENTS

| | | | |
|---|---|---|---|
| 2021/0237759 A1* | 8/2021 | Wray | B60W 60/0011 |
| 2025/0136130 A1* | 5/2025 | Shetty | B60W 60/001 |
| 2025/0153709 A1* | 5/2025 | Wu | B60W 30/08 |

FOREIGN PATENT DOCUMENTS

| | | | | |
|---|---|---|---|---|
| GB | 2632656 A | * | 2/2025 | B60W 30/09 |

OTHER PUBLICATIONS

ADAPT: Action-Aware Driving Caption Transformer (Feb. 2023) (Year: 2023).*

* cited by examiner

*Primary Examiner* — Masud Ahmed
(74) *Attorney, Agent, or Firm* — Sheppard, Mullin, Richter & Hampton LLP; Xin Xie

(57) ABSTRACT

A system includes one or more processors that obtaining data from one or more source. The data includes an ongoing or planned locomotive action and contextual information associated with the locomotive action. The processors also synchronize the data, generate an output comprising textual components, and convert the output. The processors may execute the locomotive action which may include a driving action.

20 Claims, 19 Drawing Sheets

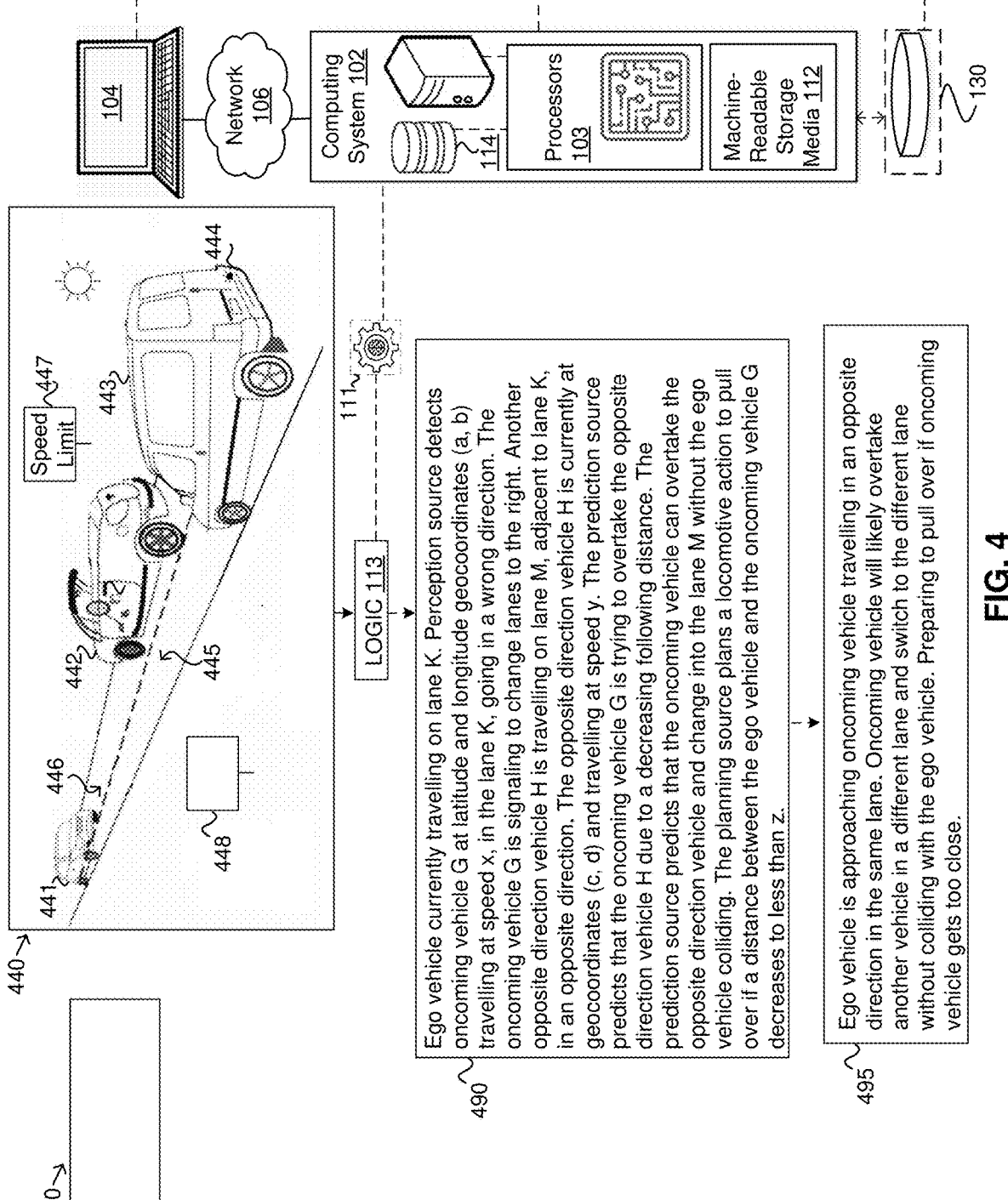

FIG. 4

490 — Ego vehicle currently travelling on lane K. Perception source detects oncoming vehicle G at latitude and longitude geocoordinates (a, b) travelling at speed x, in the lane K, going in a wrong direction. The oncoming vehicle G is signaling to change lanes to the right. Another opposite direction vehicle H is travelling on lane M, adjacent to lane K, in an opposite direction. The opposite direction vehicle H is currently at geocoordinates (c, d) and travelling at speed y. The prediction source predicts that the oncoming vehicle G is trying to overtake the opposite direction vehicle H due to a decreasing following distance. The prediction source predicts that the oncoming vehicle can overtake the opposite direction vehicle and change into the lane M without the ego vehicle colliding. The planning source plans a locomotive action to pull over if a distance between the ego vehicle and the oncoming vehicle G decreases to less than z.

495 — Ego vehicle is approaching oncoming vehicle travelling in an opposite direction in the same lane. Oncoming vehicle will likely overtake another vehicle in a different lane and switch to the different lane without colliding with the ego vehicle. Preparing to pull over if oncoming vehicle gets too close.

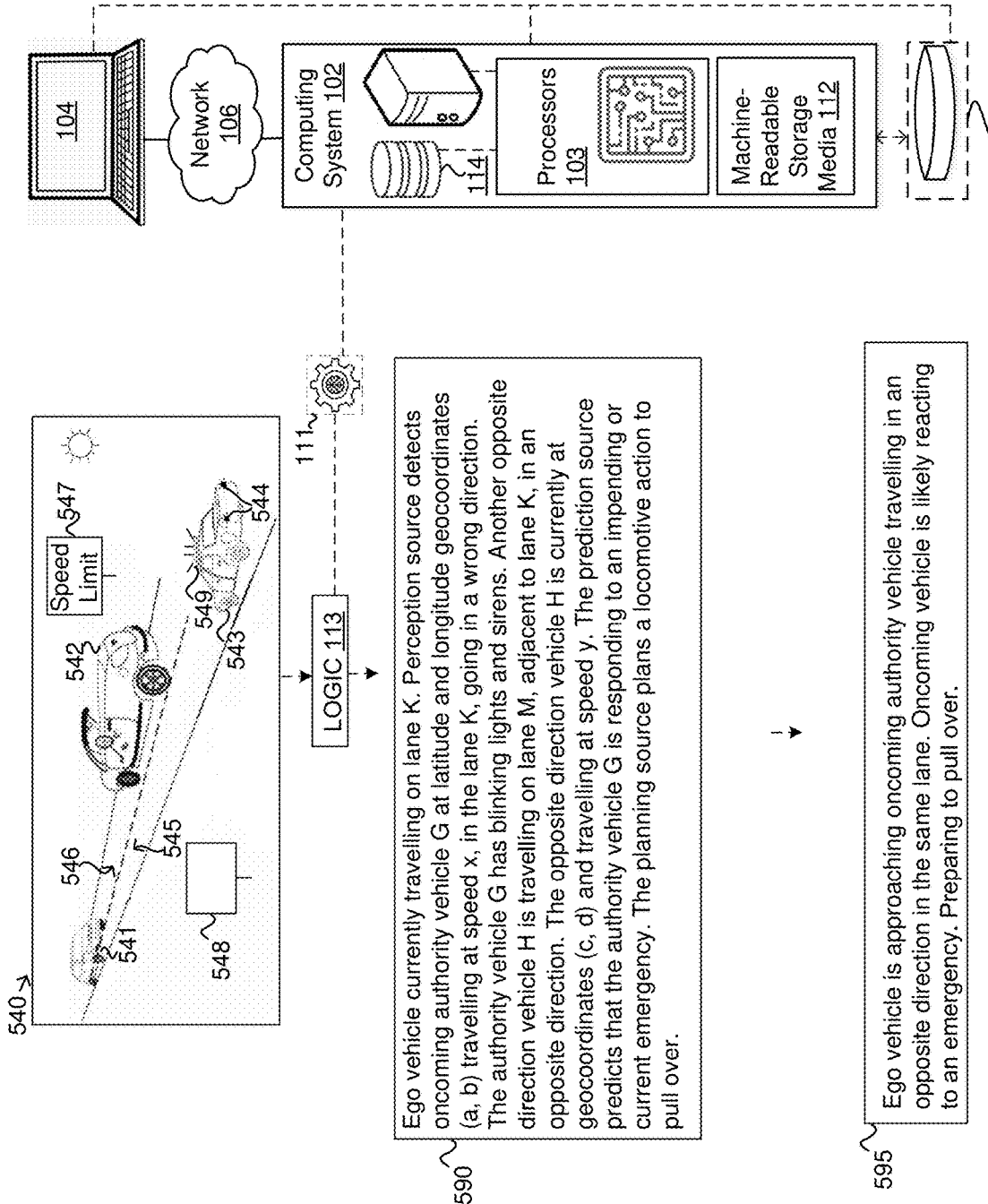

590

Ego vehicle currently travelling on lane K. Perception source detects oncoming authority vehicle G at latitude and longitude geocoordinates (a, b) travelling at speed x, in the lane K, going in a wrong direction. The authority vehicle G has blinking lights and sirens. Another opposite direction vehicle H is travelling on lane M, adjacent to lane K, in an opposite direction. The opposite direction vehicle H is currently at geocoordinates (c, d) and travelling at speed y. The prediction source predicts that the authority vehicle G is responding to an impending or current emergency. The planning source plans a locomotive action to pull over.

595

Ego vehicle is approaching oncoming authority vehicle travelling in an opposite direction in the same lane. Oncoming vehicle is likely reacting to an emergency. Preparing to pull over.

FIG. 5

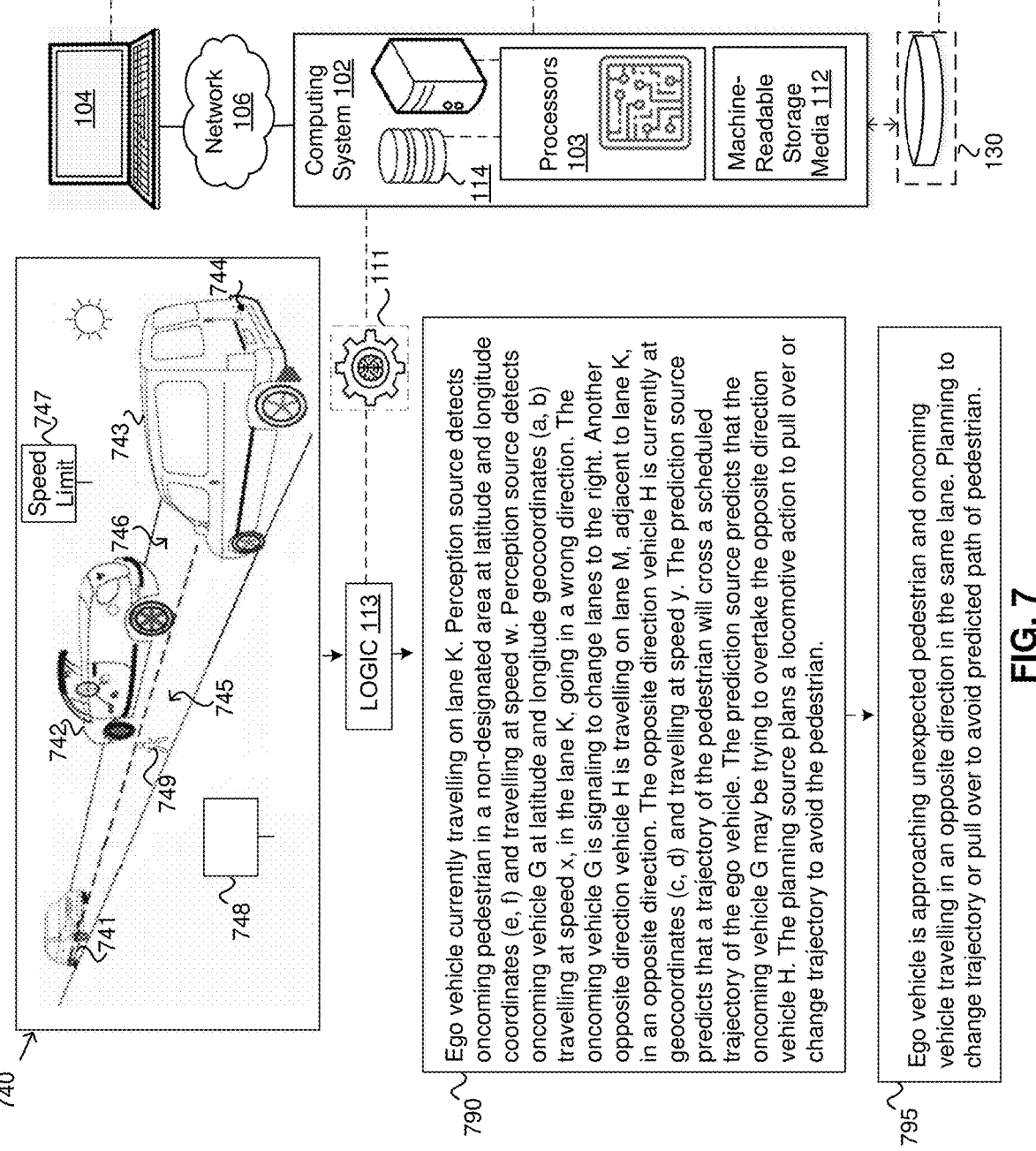

Ego vehicle currently travelling on lane K. Perception source detects oncoming pedestrian in a non-designated area at latitude and longitude coordinates (e, f) and travelling at speed w. Perception source detects oncoming vehicle G at latitude and longitude geocoordinates (a, b) travelling at speed x, in the lane K, going in a wrong direction. The oncoming vehicle G is signaling to change lanes to the right. Another opposite direction vehicle H is travelling on lane M, adjacent to lane K, in an opposite direction. The opposite direction vehicle H is currently at geocoordinates (c, d) and travelling at speed y. The prediction source predicts that a trajectory of the pedestrian will cross a scheduled trajectory of the ego vehicle. The prediction source predicts that the oncoming vehicle G may be trying to overtake the opposite direction vehicle H. The planning source plans a locomotive action to pull over or change trajectory to avoid the pedestrian.

Ego vehicle is approaching unexpected pedestrian and oncoming vehicle travelling in an opposite direction in the same lane. Planning to change trajectory or pull over to avoid predicted path of pedestrian.

FIG. 7

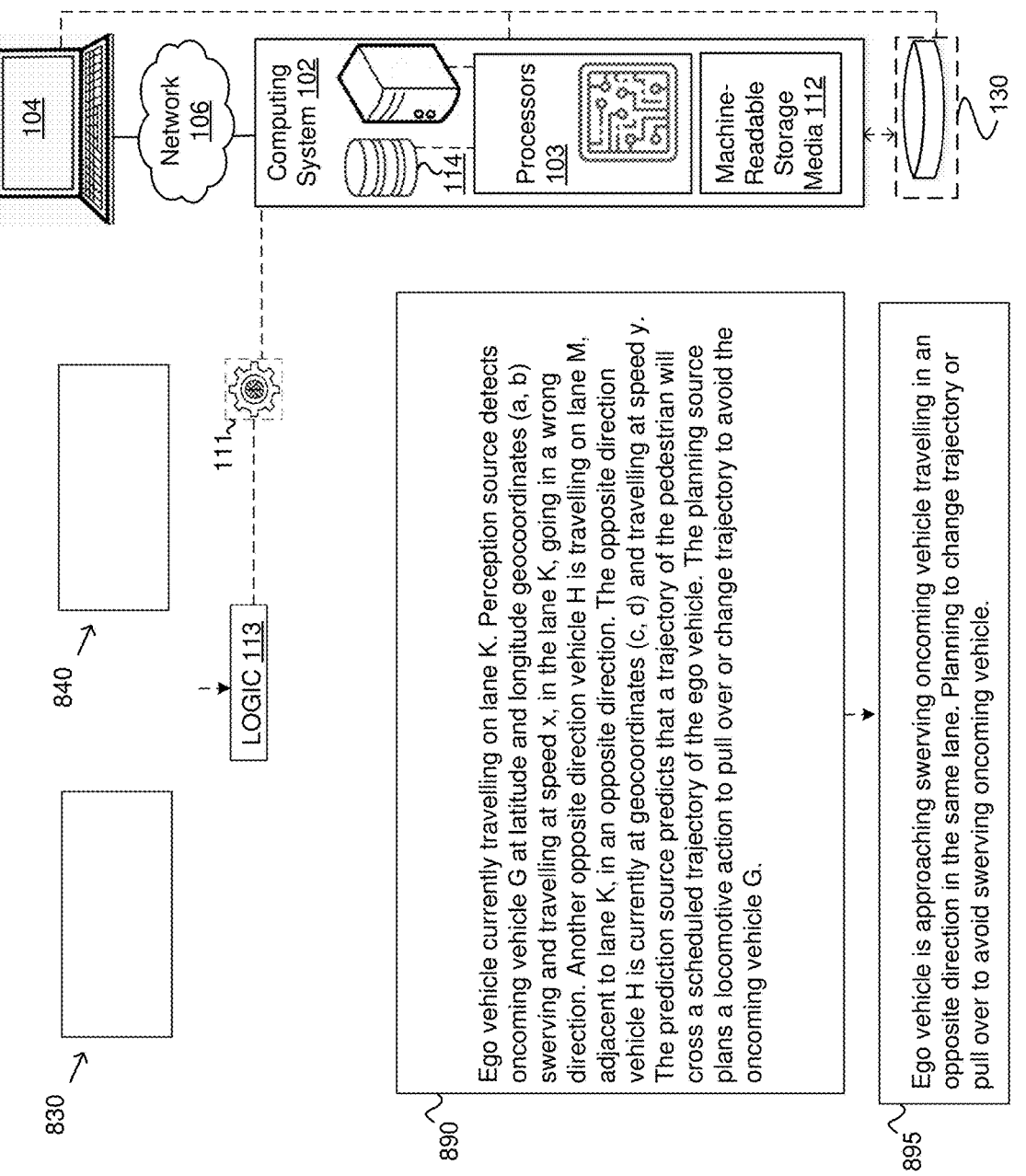

840

830

111

LOGIC 113

104

Network 106

Computing System 102

114

Processors 103

Machine-Readable Storage Media 112

130

890    Ego vehicle currently travelling on lane K. Perception source detects oncoming vehicle G at latitude and longitude geocoordinates (a, b) swerving and travelling at speed x, in the lane K, going in a wrong direction. Another opposite direction vehicle H is travelling on lane M, adjacent to lane K, in an opposite direction. The opposite direction vehicle H is currently at geocoordinates (c, d) and travelling at speed y. The prediction source predicts that a trajectory of the pedestrian will cross a scheduled trajectory of the ego vehicle. The planning source plans a locomotive action to pull over or change trajectory to avoid the oncoming vehicle G.

895    Ego vehicle is approaching swerving oncoming vehicle travelling in an opposite direction in the same lane. Planning to change trajectory or pull over to avoid swerving oncoming vehicle.

FIG. 8B

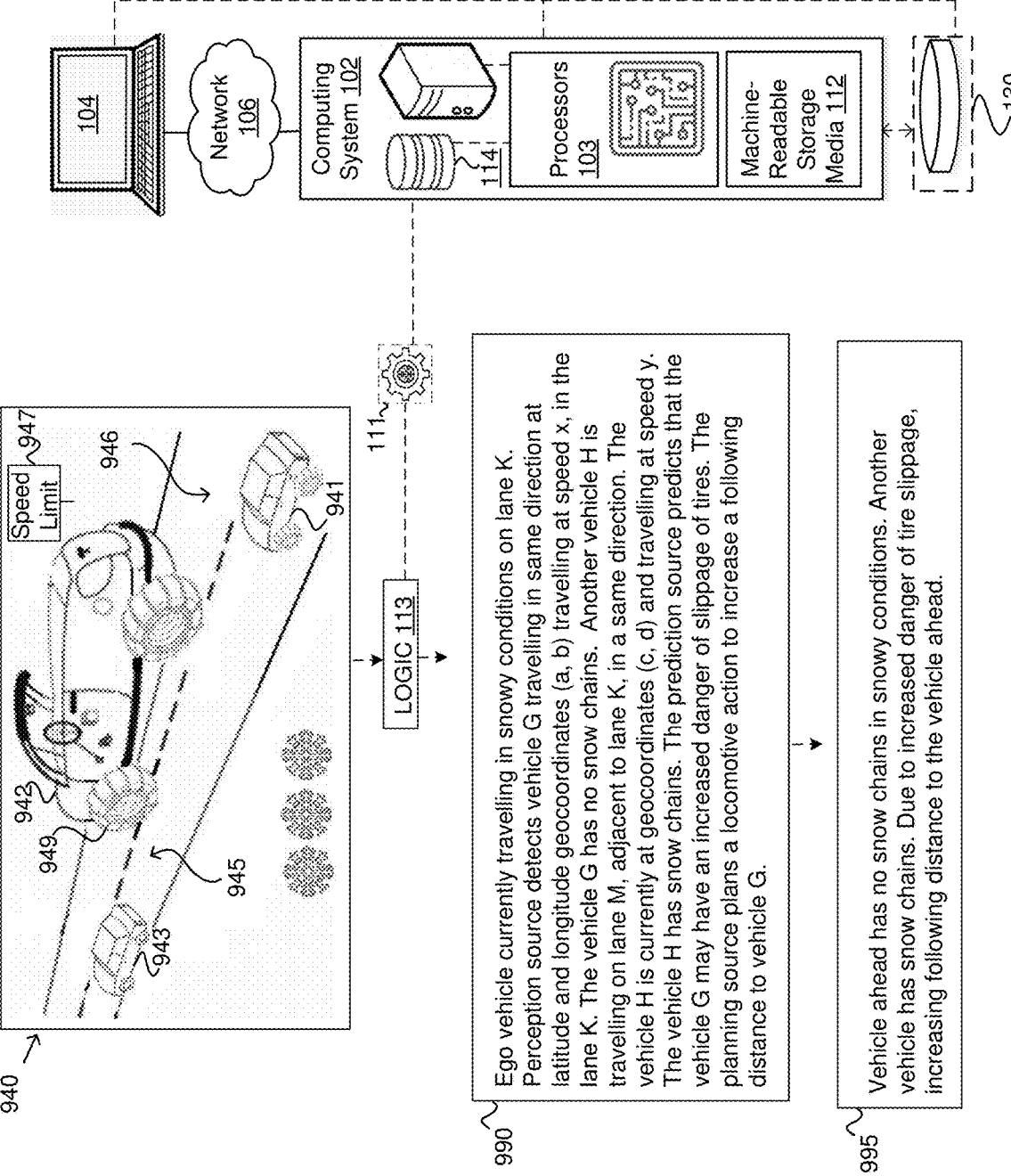

Ego vehicle currently travelling in snowy conditions on lane K. Perception source detects vehicle G travelling in same direction at latitude and longitude geocoordinates (a, b) travelling at speed x, in the lane K. The vehicle G has no snow chains. Another vehicle H is travelling on lane M, adjacent to lane K, in a same direction. The vehicle H is currently at geocoordinates (c, d) and travelling at speed y. The vehicle H has snow chains. The prediction source predicts that the vehicle G may have an increased danger of slippage of tires. The planning source plans a locomotive action to increase a following distance to vehicle G.

Vehicle ahead has no snow chains in snowy conditions. Another vehicle has snow chains. Due to increased danger of tire slippage, increasing following distance to the vehicle ahead.

FIG. 9

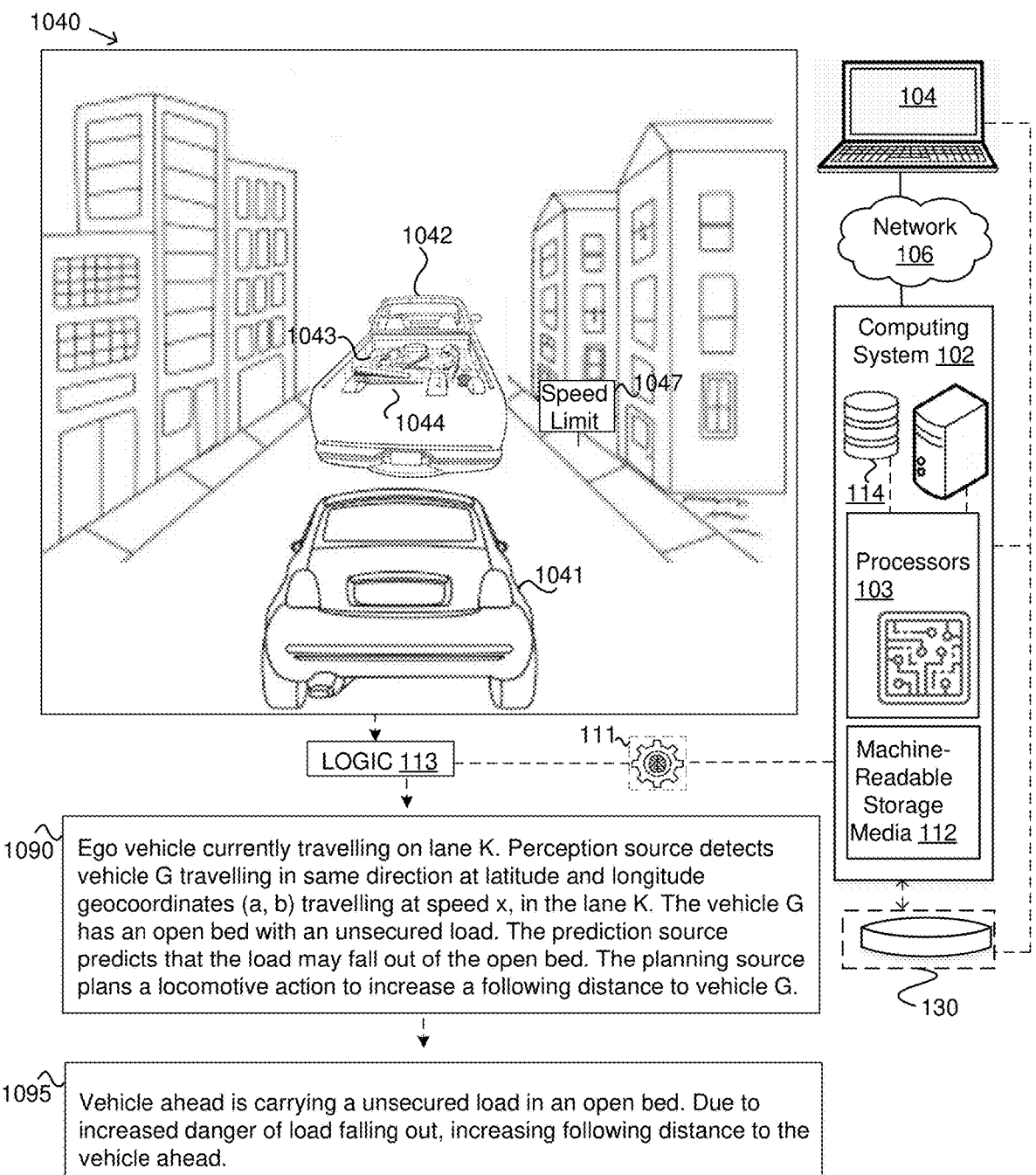

1090 Ego vehicle currently travelling on lane K. Perception source detects vehicle G travelling in same direction at latitude and longitude geocoordinates (a, b) travelling at speed x, in the lane K. The vehicle G has an open bed with an unsecured load. The prediction source predicts that the load may fall out of the open bed. The planning source plans a locomotive action to increase a following distance to vehicle G.

1095 Vehicle ahead is carrying a unsecured load in an open bed. Due to increased danger of load falling out, increasing following distance to the vehicle ahead.

FIG. 10

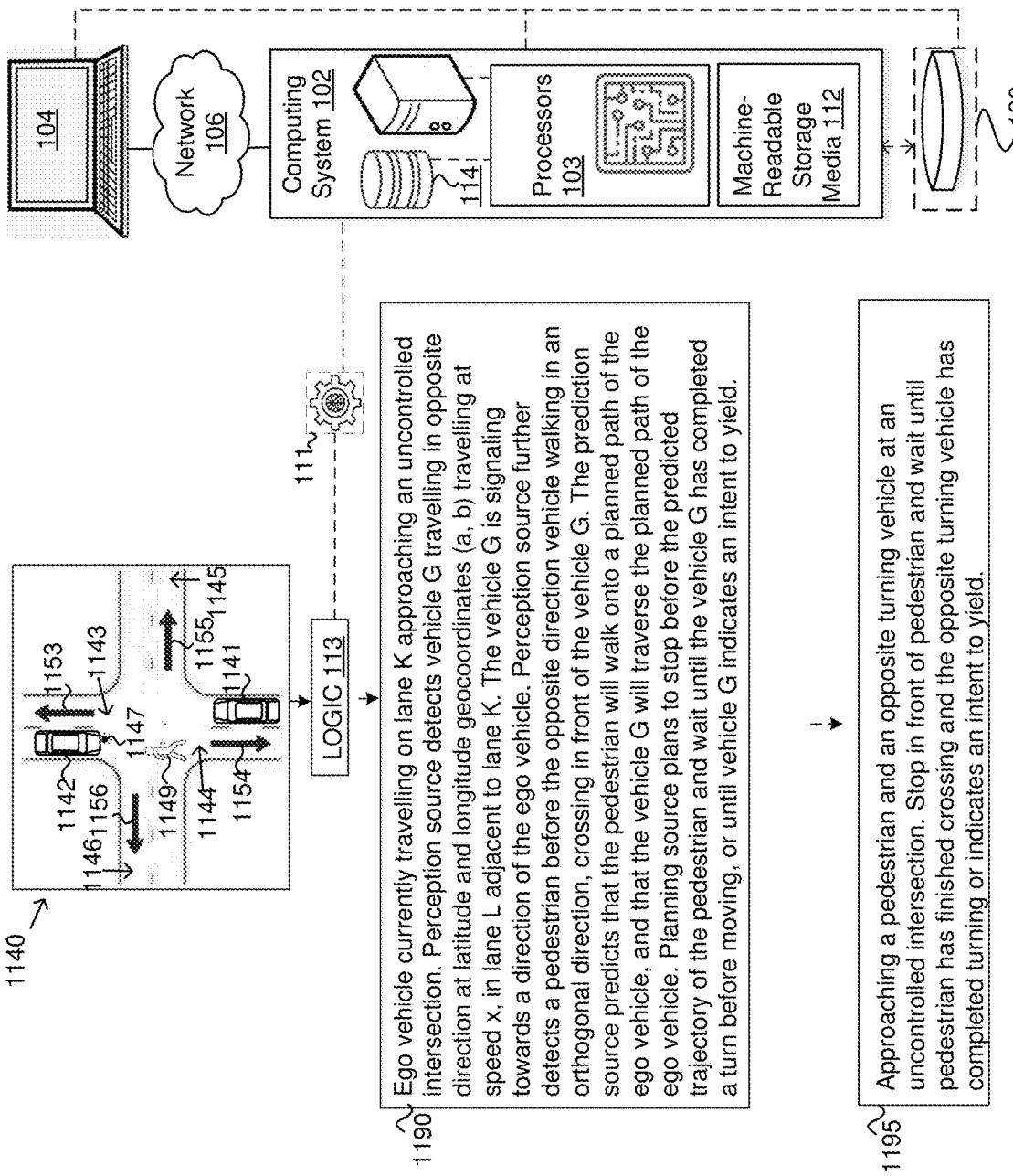

1140

1153
1143
1147
1142
1146 1156
1149
1144
1154
1141
1155 1145

LOGIC 113

104

Network
106

Computing
System 102

114

Processors
103

Machine-
Readable
Storage
Media 112

111

130

1190 Ego vehicle currently travelling on lane K approaching an uncontrolled intersection. Perception source detects vehicle G travelling in opposite direction at latitude and longitude geocoordinates (a, b) travelling at speed x, in lane L adjacent to lane K. The vehicle G is signaling towards a direction of the ego vehicle. Perception source further detects a pedestrian before the opposite direction vehicle walking in an orthogonal direction, crossing in front of the vehicle G. The prediction source predicts that the pedestrian will walk onto a planned path of the ego vehicle, and that the vehicle G will traverse the planned path of the ego vehicle. Planning source plans to stop before the predicted trajectory of the pedestrian and wait until the vehicle G has completed a turn before moving, or until vehicle G indicates an intent to yield.

1195 Approaching a pedestrian and an opposite turning vehicle at an uncontrolled intersection. Stop in front of pedestrian and wait until pedestrian has finished crossing and the opposite turning vehicle has completed turning or indicates an intent to yield.

FIG. 11

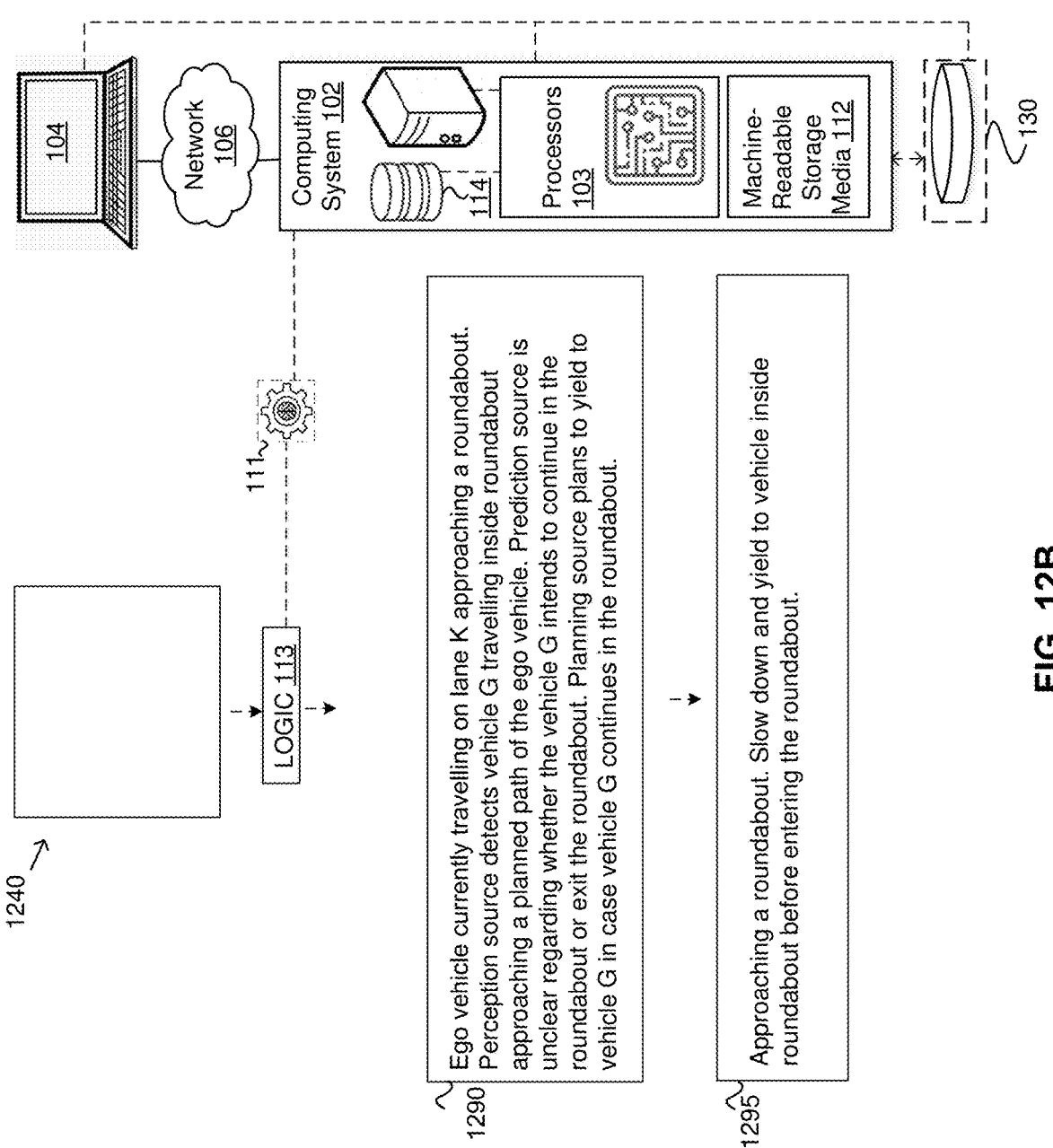

1240

LOGIC 113

104

Network 106

Computing System 102

114

Processors 103

Machine-Readable Storage Media 112

130

111

1290 Ego vehicle currently travelling on lane K approaching a roundabout. Perception source detects vehicle G travelling inside roundabout approaching a planned path of the ego vehicle. Prediction source is unclear regarding whether the vehicle G intends to continue in the roundabout or exit the roundabout. Planning source plans to yield to vehicle G in case vehicle G continues in the roundabout.

1295 Approaching a roundabout. Slow down and yield to vehicle inside roundabout before entering the roundabout.

FIG. 12B

Computing Component 1600

Hardware Processors 1602

Machine-Readable Storage Media 1604

Obtain data from one or more sources 1606

Synchronize the data 1608

Generate an output comprising textual components, wherein the output comprises a version of the synchronized data 1610

Converting the output into a converted output 1612

1700

Processor(s)
1704

Network
Interface(s)
1718

Bus
1702

Main
Memory
1706

ROM
1708

Storage
1710

Display
1712

Input
Device(s)
1714

Cursor
Control
1716

TRANSPARENCY AND VALIDATION OF VEHICLE LOCOMOTIVE ACTIONS

BACKGROUND

By 2040, an anticipated 75 percent of vehicles will be autonomous or semi-autonomous, according to the Institute of Electrical and Electronics Engineers (IEEE). The rapid proliferation of autonomous or semi-autonomous vehicles has increased an urgency for safety verification and transparency of decision making of these vehicles. Safety of autonomous vehicles is a paramount concern because any safety deficiencies may potentially result in grave consequences.

SUMMARY

Described herein, in some examples, is a computing system. The computing system includes one or more processors and a memory storing instructions that, when executed by the one or more processors, cause the computing system to perform certain operations. These operations may include obtaining information or data (hereinafter "data") from one or more sources, components, constituents, stacks, or modules (hereinafter "sources"). The data may include a navigation or locomotive decision or action (hereinafter "locomotive action") or a planned locomotive action and contextual information, such as an event or stimulus, associated with and/or triggering the locomotive action. The computing system synchronizes the data, modifies, converts, reformats, organizes, collates, standardizes, translates, and/or normalizes (hereinafter "modifies") the synchronized data, and generates a version of the modified data which may include textual components. The computing system may convert the version into a converted, condensed, simplified, summarized, interpreted, deciphered, or alternative (hereinafter "converted") version, which may include natural language syntax.

In some examples, the contextual information includes an event or a stimulus that triggered the ongoing or planned locomotive action.

In some examples, the contextual information includes information of an external entity that is external to the system, an internal component that is internal to the system, or a change of an environmental condition.

In some examples, the contextual information includes information regarding a potential malfunction of the internal component; and the data comprises a planned locomotive action indicating to reduce a speed of the system, or a vehicle associated with the system, or to stop (e.g., pull over to a side of a road or another stop area).

In some examples, the contextual information includes information from a perception model or algorithm, a planning model or algorithm, a prediction model or algorithm, a localization model or algorithm, or a control model or algorithm.

In some examples, the instructions further cause the system to perform: executing the planned locomotive action; and monitoring one or more attributes of the system during the executing of the locomotive action.

In some examples, the converting of the output comprises selectively removing portions of the generated output based on respective priorities of the portions. For example, some portions include data of lower priority and may be removed.

In some examples, the obtaining of the data comprises obtaining packets from the one or more sources, the synchronizing of the data comprises synchronizing respective payloads of the packets, and the generating of the output comprises generating a new packet having the output within a payload of the new packet.

In some examples, the obtaining of the data comprises obtaining fused sensor data from different sensor modalities.

In some examples, the converting of the output is performed by a machine learning component, the machine learning component comprising a large language model (LLM).

In some examples, the planned locomotive action is based on signaling of an external entity, and/or an inferred intent of the external entity. The generated output and/or the converted output indicates the signaling of the external entity and/or the inferred intent of the external entity.

In some examples, the planned locomotive action is based on a presence of an external entity, the external entity including a non-terrestrial entity. The generated output and/or the converted output indicates the presence of the external entity.

In some examples, the planned locomotive action is based on a presence of a non-vehicular entity. The generated output and/or the converted output indicates the presence of the non-vehicular entity.

In some examples, the planned locomotive action is based on a behavior or a predicted behavior of an external entity. The generated output and/or the converted output indicates the behavior or predicted behavior of the external entity.

In some examples, the planned locomotive action is based on a presence or an absence of equipment or accessories attached to an external entity. The generated output and/or the converted output indicates the equipment or accessories attached to an external entity In some examples, the planned locomotive action is based on a road geometry. The generated output and/or the converted output indicates the road geometry.

Various embodiments of the present disclosure provide a method implemented by a system as described above.

These and other features of the apparatuses, systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIGS. 3-7, 8A, 8B, 9-11, 12A, and 12B illustrate different examples of generating an output due to different detected events and/or stimuli.

FIG. 3 illustrates an example implementation of a computing system generating an output indicating a planned locomotive action due to signaling and/or historical or inferred intents and/or behaviors of dynamic entities.

FIG. 4 illustrates an example implementation of a computing system generating an output indicating a planned locomotive action due to signaling and/or historical or inferred intents and/or behaviors of dynamic entities.

FIG. 5 illustrates an example implementation of a computing system generating an output indicating a planned locomotive action due to signaling from dynamic entities and/or based on types of dynamic entities.

FIG. 6 illustrates an example implementation of a computing system generating an output indicating a planned locomotive action due to signaling from dynamic entities and/or based on types of dynamic entities, which may include non-terrestrial (e.g., non-land based) entities.

FIG. 7 illustrates an example implementation of a computing system generating an output indicating a planned locomotive action due to detecting dynamic entities of certain types, which may include non-vehicular entities such as pedestrians and/or animals.

FIGS. 8A-8B illustrate an example implementation of a computing system generating an output indicating a planned locomotive action due to dynamic entity behaviors, including abnormal and/or unpredictable behaviors such as swerving.

FIGS. 9-10 illustrate an example implementation of a computing system generating an output indicating a planned locomotive action due to a potential inferred danger.

FIGS. 11, 12A and 12B illustrate an example implementation of a computing system generating an output indicating a planned locomotive action corresponding to a road geometry.

Figure 1:
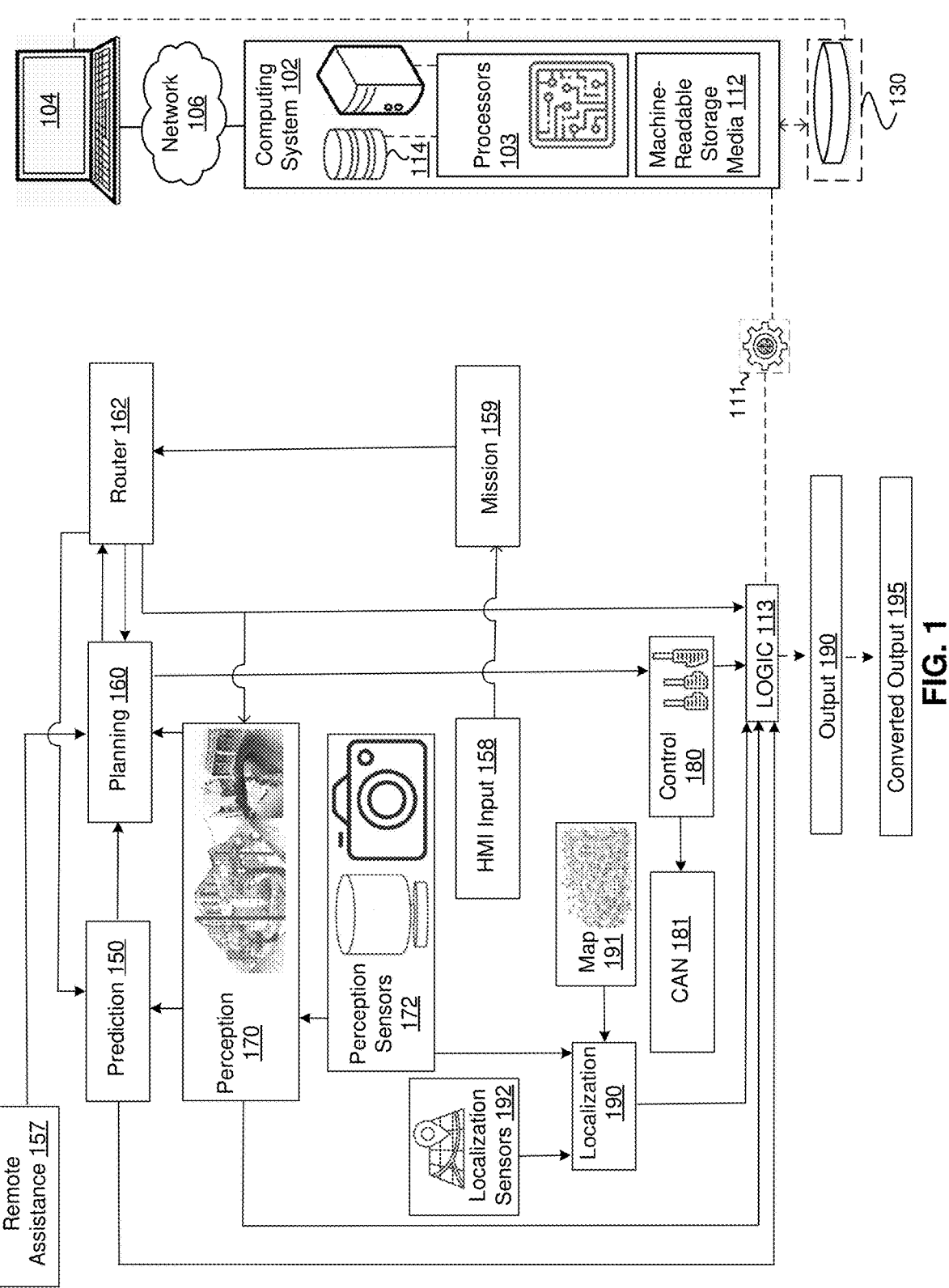
FIG. 1 illustrates an example implementation of a computing system that obtains data from different sources, generates textual output that characterizes a locomotive action, and rationale regarding the locomotive action, and converts the output into a converted version, or a condensed format.

Principles from different figures may apply to, and/or be combined with other figures as suitable. For example, the principles illustrated and described in FIGS. 1, 2, and 3 may be applied to and/or combined with principles from any of FIGS. 4-7, 8A, 8B, 9-11, 12A, 12B, and 13-17, and vice versa.

DETAILED DESCRIPTION

Safety of vehicles, such as autonomous and semi-autonomous vehicles, remains a paramount concern before widespread deployment. A lack of adequate safety is a limiting factor that prevents regulatory approval or acceptance as well as driver or passenger acceptance and adoption of autonomous vehicles. Current safety verification and analysis techniques include real-world testing and simulations. These techniques often are limited either in the extent of driving scenarios captured or the degree of accuracy in capturing real-world conditions. An additional bottleneck is that analysis, troubleshooting, and/or review of decision making, which is usually performed via post-event analyses, relies on inadequate data that may be too esoteric.

To address and/or alleviate such safety concerns and acceptance, more comprehensive and intelligible processes of decision making of these vehicles should be recorded and outputted. As a result, the decision making processes will be transparent, analyzable, and verifiable. The output of the decision making may include a narrative and textual format that integrates one or more sources. The output may encompass a traceable verification of safety procedures of an autonomous vehicle while recording perceptions, inferences, analyses, explanations, intentions, and actions or planned actions. In such a manner, the output provides a documentation or log (hereinafter "documentation") of a decision making procedure. The output facilitates transparency and understanding of the decision making procedure to passengers onboard these vehicles, and may be generated in real-time or near real-time. As a result, an enhanced computing system which generates and provides this output is a catalyst that improves robustness of vehicle testing and validation, which in turn leads to safer vehicles, a more informed decision making process, and more streamlined regulatory approval processes, such as those pertaining to Society of Automotive Engineers (SAE) standards.

A computing system may obtain data from one or more sources, such as from a perception module, a localization module, a planning module, a control module, and/or a prediction module associated with software running on an autonomous vehicle. The one or more modules may be internal within, or external to, the computing system. The aforementioned modules may include computing resources, algorithms, and/or models to perform the designated functions. Any of the aforementioned modules may be spatially combined. The control module may encompass an electronic control module (ECM). The data may include an action, a scheduled action, or a planned action (hereinafter "action"), for example, from the planning module or the control module. The data may contextual information associated with and/or triggering a locomotive action, such as a detection of an external object or entity, a detection of an internal condition within the vehicle, and/or a detection of a change in environmental condition or stimulus.

The computing system may include or be associated with machine learning components such as a Large Language Model (LLM), to generate a textual version, output, commentary, notification, message, packet, frame, and/or description (hereinafter "output") regarding the action and the contextual information, and/or convert the output to a converted output, which may include natural language syntax and be in a condensed form compared to the output. Any relevant operations attributed to the computing system may also be attributed to the machine learning components. In some examples, the generating of the output may include synchronizing data from different sources, modifying the synchronized data, and generating a structured textual output, which may include generating a packet or other data structure and extracting a payload, from the packet, corresponding to the output. For example, data from different sources, which may include sensor data, media files, textual data, log data, unstructured data, and/or structured data, may originally exist in different formats or types. Synchronization of the data may include normalizing and/or standardizing the data from the different sources into one or more common formats in order to read and/or interpret the data. The computing system may convert the structured textual output to the converted output, which may have natural language syntax. The output and/or the converted output may be transmitted to an interface, as will be described below, and/or to a passenger, a pedestrian, or a remote operator.

In some examples, the generating of the output, and the converting of the output to a converted output may be based on an ontological framework. For example, the ontological framework may correlate or map certain data or events to planned actions, such as increase in precipitation or decrease in visibility to a reduction of speed. Moreover, the ontological framework may define certain aspects of a mapping between the generated output and the converted output, such as certain categories or types of details and/or fields to omit, simplify, or merge when converting the output to a converted output. For example, the ontological framework may specify that numerical or quantitative details should be omitted and translated when converting to the converted output. As another example, the ontological framework may link translations of certain technical or esoteric terms to equivalent, analogous, or similar terms that are simplified and/or less technical. As another example, the ontological framework may specify priorities, urgencies, importance, or precedence of certain data, which may be indicative of entities of certain types or categories, such as pedestrians. For example, when converting from a generated output to a converted output, only data that exceeds a threshold priority or importance and/or that satisfies a certain precedence may appear in the converted output.

FIG. 1 illustrates an example implementation of a computing system 102, which may be associated with an ego vehicle, that automatically obtains or derives (hereinafter "obtains") data from different sources, generates a textual output that characterizes a locomotive action, and rationale regarding the locomotive action, and converts the output obtained from the difference sources into a condensed format. Relevant principles from FIG. 1 are also applicable to any subsequent FIGS. The data may include an ongoing, planned, or scheduled locomotive action, and contextual information regarding the locomotive action. The contextual information may include one or more events or stimuli that triggered or caused the locomotive action.

The implementation can include at least one computing device 104 which may include or be part of a human-machine interface (HMI) and be operated by an entity such as a user. In some examples, an HMI may be accessible by entities such as a passenger, and/or a remote operator. The user may submit a request or query through the computing device 104. In some examples, the computing device 104 may receive the request or query from the user or from another computing device, computing process, artificial intelligence (AI) process, or pipeline. Such a request or query may relate or pertain to an output or converted output. Results or outputs to the query may include the output, converted output, and/or the data from which the output was generated.

Results may be stored in a database 130, as will be subsequently described. In general, the user can interact with the database 130 directly or over a network 106, for example, through one or more graphical user interfaces, application programming interfaces (APIs), and/or webhooks, for example, running on the computing device 104. The computing device 104 may include one or more processors and memory. In some examples, the computing device 104 may visually render any results generated, such as the output, the converted output, and/or the data from which the output was generated.

The computing system 102 may include one or more processors 103 which may be configured to perform various operations by interpreting machine-readable instructions, for example, from a machine-readable storage media 112. In some examples, one or more of the processors 103 may be combined or integrated into a single processor, and some or all functions performed by one or more of the processors 103 may not be spatially separated, but instead may be performed by a common processor. The processors 103 may be physical or virtual entities. For example, as physical entities, the processors 103 may include one or more processing circuits, each of which can include one or more processing cores. Additionally or alternatively, for example, as virtual entities, the processors 103 may be encompassed within, or manifested as, a program within a cloud environment. The processors 103 may constitute separate programs or applications compared to machine learning components (e.g., one or more machine learning components 111). The computing system 102 may also include a storage 114, which may include a cache for faster access compared to the database 130.

The processors 103 may further be connected to, include, or be embedded with logic 113 which, for example, may include, store, and/or encapsulate instructions that are executed to carry out the functions of the processors 103. In general, the logic 113 may be implemented, in whole or in part, as software that is capable of running on the computing system 102, and may be read or executed from the machine-readable storage media 112. The logic 113 may include, as nonlimiting examples, parameters, expressions, functions, arguments, evaluations, conditions, and/or code. Here, in some examples, the logic 113 encompasses functions of or related to obtaining or deriving data from different sources and generating, from the data, textual output and converting the textual output into a condensed format.

The database 130 may include, or be capable of obtaining or storing, a subset (e.g., a portion or all of) the data from different sources, corresponding outputs generated, and/or the condensed outputs. The database 130 may store any intermediate results during the process of generating the outputs and the condensed outputs.

The database 130 may also store any data and/or metadata of a training process of the machine learning components, including intermediate or final outputs from training of machine learning components 111, and/or attributes, such as feature weights, corresponding to operations of the machine learning components 111.

The computing system 102 may also include, be associated with, and/or be implemented in conjunction with, the one or more machine learning components 111, which may encompass a large language model (LLM). The machine learning components 111 may perform unsupervised learning. In some examples, the machine learning components 111 may perform and/or execute functions in conjunction with the logic 113. Thus, any operations or any reference to the machine learning components 111 may be understood to potentially be implemented in conjunction with the logic 113 and/or the computing system 102. The machine learning components 111 may be trained to perform and/or execute certain functions, such as generating outputs corresponding to the data obtained from different sources, and/or converting the generated output. In some examples, the generating of the outputs may be performed without the machine learning components 111.

The machine learning components 111, in some examples, may decipher, translate, elucidate, or interpret data from the different sources, in order to extract or obtain relevant information to infer or determine that a locomotive action is being performed, or scheduled or predicted to be performed. The machine learning components 111 may further obtain relevant contextual information linked to, related to, and/or triggering the locomotive action, based on the aforementioned ontological framework which defines links between specific contextual information and specific locomotive actions.

In FIG. 1, the logic 113 may ingest, obtain, or derive data from different sources. This data may include raw and/or processed data, and may be manifested in different formats, including textual data, media data, binary data, unstructured data, and/or structured data. The different sources may include a prediction source 150, a planning source 160, a perception source 170, a control source 180, a localization source 190, and/or a router 162. Any of the aforementioned sources may be part of the computing system 102, or may be external to the computing system 102.

The perception source 170 may obtain and/or process sensor data from perception sensors 172, which may include sensors of different modalities including any of Lidar, camera, radar, ultrasonic, sonar, and/or far infrared (FIR) sensors. The perception sensors 172 may work in conjunction with any localization sensors as subsequently described. The perception source 170 may combine, merge, or fuse (hereinafter "combine") data from different modalities. The perception source 170 may perform entity recognition, for example, based on semantic segmentation and/or instance segmentation. The perception source 170 may thus recognize entities and attributes thereof, including locations and characteristics of the entities.

The perception source 170 may feed or provide outputs to the prediction source 150 and/or the planning source 160. The prediction source 150 may predict one or more trajectories and/or behaviors of entities that were captured by the perception source 170 using one or more models such as machine learning models or classical models and depending on types and/or historical behaviors of the entities. The prediction source 150 may feed or provide outputs to the planning source 160.

The planning source 160 may plan one or more actions, such as navigation or locomotive actions which may encompass planning a route based on the outputs from the perception source 170 and/or the prediction source 150, and/or planning actuation-related actions such as changing lanes, braking, and/or accelerating, or controlling modes such as cruise control (e.g., adaptive cruise control, intelligent cruise control). The planning source 160 may obtain outputs of a remote assistance source 157 which may be external to the ego vehicle. For example, the planning source 160 may obtain indications of remote operations such as tele assistance or teleoperations, and accordingly modify plans. The control source 180 may receive outputs from the planning source 160. The control source 180 may implement any of, or a subset (e.g., a portion) or all of the actions planned by the planning source 160.

The localization source 190 may obtain information from localization sensors 192, from the perception sensors 172, and/or geospatial information such as a map 191. The localization sensors 192 may include global navigation satellite system (GNSS) sensors, inertial measurement unit (IMU), accelerometers, gyroscopes, and magnetometers, which may identify a current location of the ego vehicle. The map 191 may include a standard definition (SD) or high definition (HD) map. The localization source 190 may, as a sanity check, compare one or more outputs of the perception sensors 172 to any entities, such as static entities, on the map 191. For example, if the map 191 illustrates an entity such as a traffic sign at a particular location but that entity is undetected by the perception sensors 172, the localization source 190 may determine a possible failure, malfunction, and/or lack of calibration of the perception sensors 172. The localization source 190 may either transmit this indication of a potential issue to the perception sensors 172, to a controller area network (CAN) agent 181, and/or may output this indication to the logic 113.

The control source 180 may be connected to the CAN agent 181, which may be part of or include a CAN bus. The CAN agent 181 may communicate with other controllers (e.g., microcontrollers) and devices associated with the ego vehicle, and/or may generate reports pertaining to ego vehicle operations and statuses. The router 162 may provide connection to other external entities and/or may create a vehicle area network (VAN). Meanwhile, an HMI input 158, which may be obtained from the computing device 104, may provide a mission 159 which includes an intended destination.

From the obtained data, the logic 113 may generate an output 190 and a converted output 195. The output 190 and/or the converted output 195 may include textual data. The output 190 may include a combined, compiled, and/or collated version of any indication of a planned, scheduled, and/or ongoing locomotive action or event, and/or any contextual data (e.g., triggers or stimuli) associated with the locomotive action. Meanwhile, the converted output 195 may include a summarized, generalized, and/or condensed version of the output 190. For example, the logic 113 may generate the converted output 195 by removing any numerical values or expressions or converting the numerical values to qualitative descriptions. In some examples, the logic 113 may deduplicate or remove redundant information from different sources, such as both the perception sensors 172 and/or the map 191 indicating a presence of a static entity (e.g., a traffic sign). In some examples, the logic 113 may translate esoteric and/or technical information into a natural language format that is easier for the user to comprehend.

The logic 113 may provide the converted output 195 to any interface or device, such as an HMI device (e.g., the computing device 104), and/or to other external entities such as other vehicles. The output 190, and/or data obtained by the logic 113, may be provided in an organized data structure, such as a packet, from which relevant information may be extracted. Thus, the logic 113 may process any packets received from the sources, combine, merge, and/or modify the packets received, and/or generate new packets.

Figure 2:
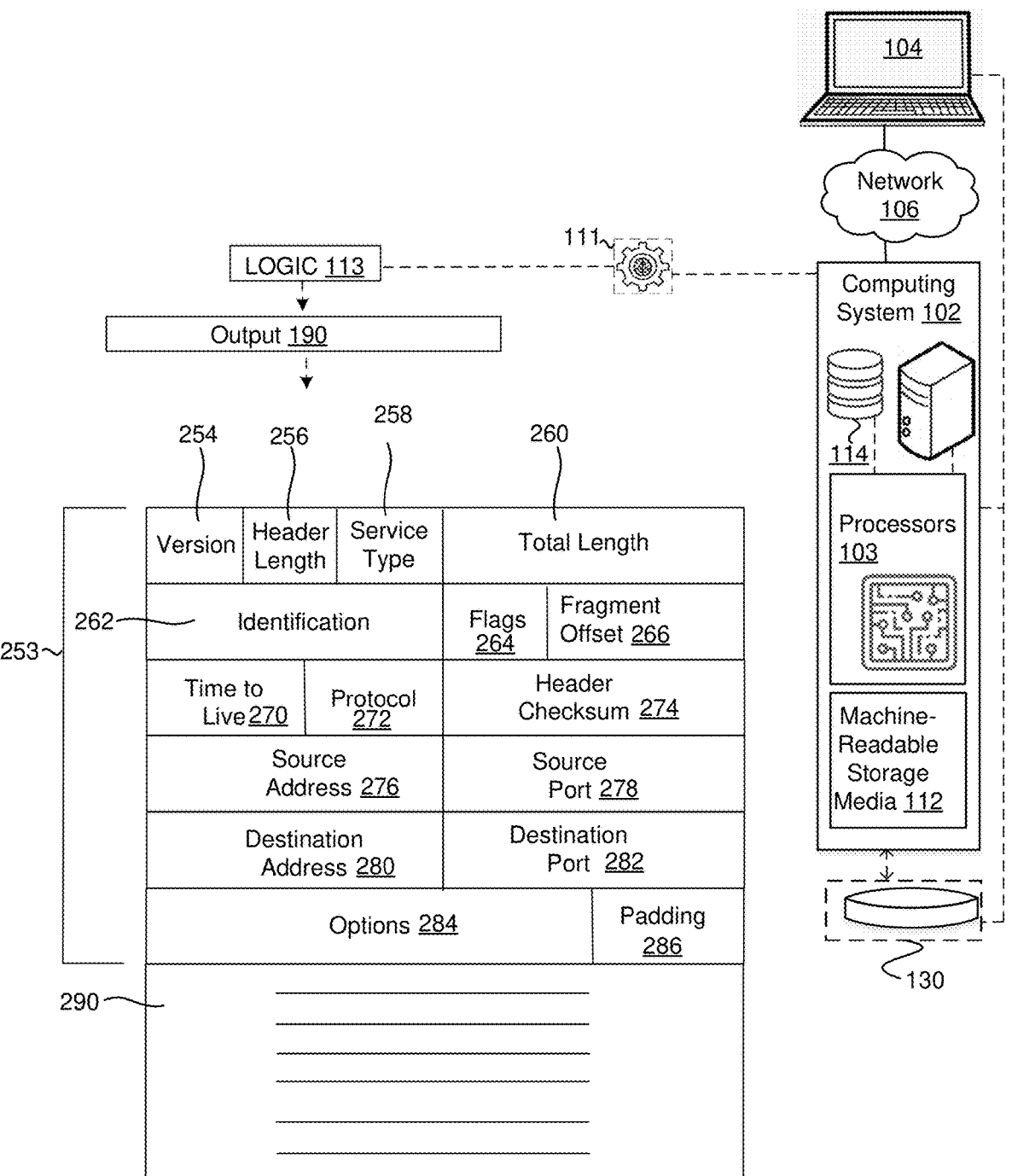
FIG. 2 illustrates an exemplary packet or data structure that stores or holds the data, output, and/or the converted output.

FIG. 2 illustrates an exemplary packet, although other organized data structures to transmit information may also be contemplated. The packet includes a header 253 and a payload 290. The header 253 may include any of a version 254, a header length 256, a service type 258, a total length 260, an identification 262, flags 264, a fragment offset 266, a time to live (TTL) 270, a protocol 272, a header checksum 274, a source address 276, a source port 278, a destination address 280, a destination port 282, options 284, and padding 286.

The version 254 may indicate protocol version. The header length 256 may indicate a size of the header 253, for example, in 32-bit words. The type of service 258 may provide a suggested quality of service, and may be set to zero. In some examples, the type of service 258 may indicate any of low-delay path, high-bandwidth path, and high-reliability path services. The total length 260 may indicate a total size of the header 253 and the payload 190. The identification 262 may be a 26-bit number that provides instructions to a destination to assemble a return packet to be returned, for example, to the logic 113 or to one or more aforementioned sources. The flags 264 may include a bit that indicates whether fragmenting of the packet 252 is permitted. The fragment offset 266 may include a value to reconstruct a fragmented packet and may indicate a relative position of the packet 252 within a data stream, such as a relative position within a file if the file is broken up into multiple packets. The time to live (TTL) 270 indicates a maximum duration, or a maximum number of hops, that the packet 252 is permitted to take before being discarded. The TTL 270 may be decremented every time the packet 252 is routed. Once decremented to zero, the packet 252 may be discarded. The protocol 272 indicates a type of packet according to a communication protocol. The header checksum 274 may include a value that the logic 113, and/or a different verification entity, verifies to detect whether corruption of the header 252 has occurred. The source address 276 may be an address of a source that generated the packet (e.g., the computing system 102, or a portion thereof).

The source port 278 may be a specific port, process, service, or application within the source address 276 which may also indicate a specific session. The destination address 280 may be an address of the destination to which the packet is sent, for example, a destination from which data is requested, such as the computing device 104. The destination port 282 may be a specific port, process, service, or application within the destination address 280. The options 284 may specify security, source routing, error reporting, debugging, time stamping, and other attributes. The padding 286 may indicate options to add zero bits in order to make the header 253 have a length of a multiple of 32 bits.

The payload 290, in some examples, may include a series of alphanumeric or binary codes that are read, deciphered, and interpreted by the logic 113 and/or the computer device 104. The logic 113 and/or the computer device 104 can convert, translate, simplify, and/or reformat the alphanumeric or binary codes to the converted output 195 of FIG. 1.

Figure 3:
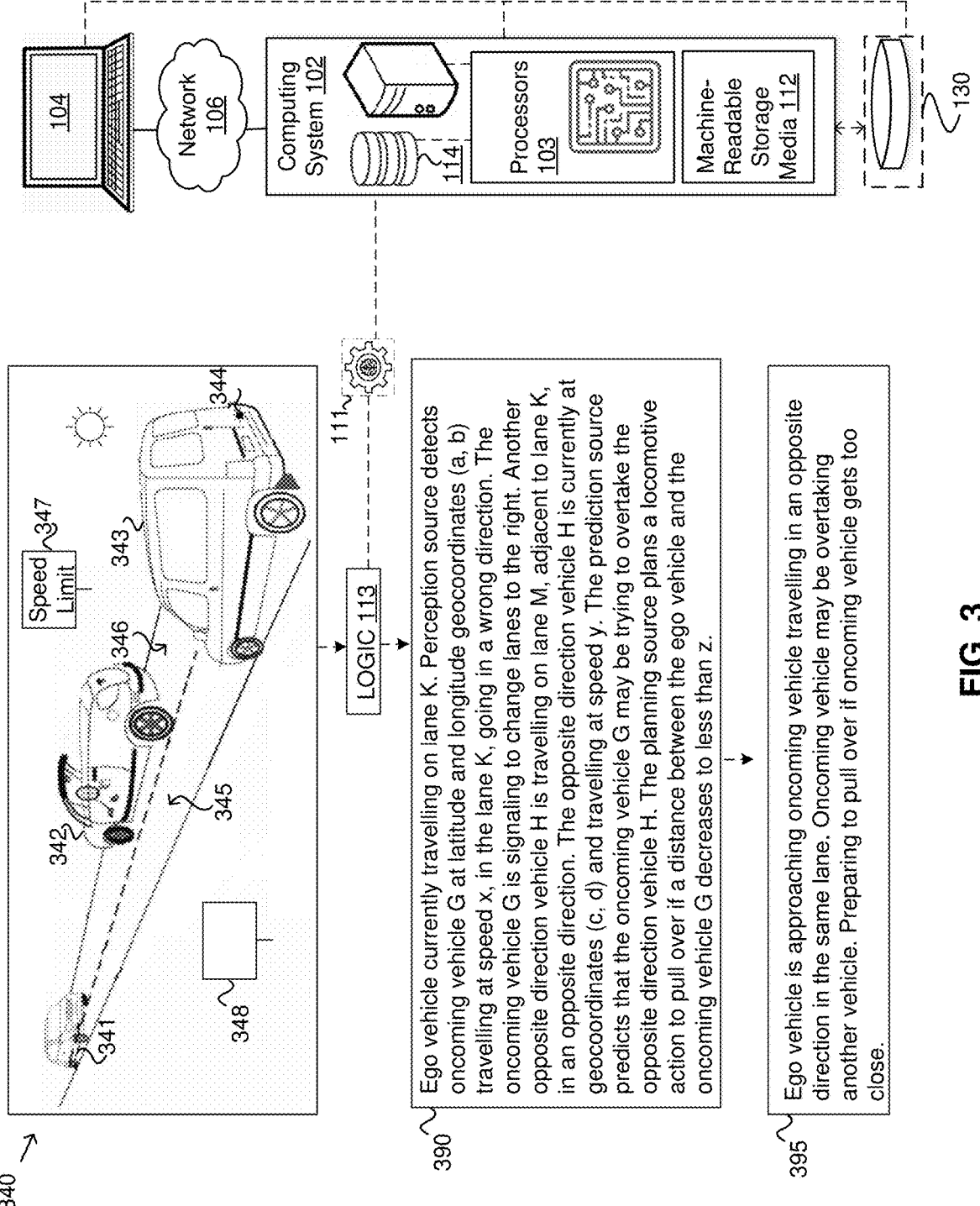

Next, FIG. 3 illustrates the logic 113 generating an output indicating a planned locomotive action due to signaling and/or historical or inferred intents and/or behaviors of dynamic entities. Relevant principles from FIG. 3 are also applicable to any preceding or subsequent FIGS. The logic 113 may communicate an inferred intent of one or more entities, and how that impacts a locomotive action. The logic 113 may obtain data 340, which may be manifested in media, textual, and/or other applicable formats. The data 340 may include an ego vehicle 341. In FIG. 3, and any relevant subsequent FIGS., although any captured sensor data from a perspective of the ego vehicle 341 may not contain the ego vehicle 341 itself, the ego vehicle 341 is shown within the data 340 for reference and illustrative purposes, including relative position and/or orientation to other entities. The ego vehicle 341 may be situated or driving on a lane 345. The data 340 may further include a first opposite direction vehicle 342 on an opposite lane 346, and a second opposite direction vehicle 343, which is facing a wrong direction, on the lane 345. The second opposite direction vehicle 343 may further include a blinking right signaling light 344 (from a perspective of the second opposite direction vehicle 343). The data 340 may further include traffic signs 347 and 348, facing opposite directions, to indicate that the lane 345 and the opposite lane 346 are indeed opposite directions. The traffic sign 348 is shown as being blank because the wording is posted on an opposite side and invisible from a perspective from which the data 340 was obtained or captured.

The logic 113 may obtain information from the different sources as described in FIG. 1, and generate an output 390 which combines the information from the different sources. The output 390 may include any changes detected, including new dynamic entities (e.g., the first opposite direction vehicle 342, the second opposite direction vehicle 343, and/or any pedestrians) detected, and/or changes in attributes of existing dynamic entities, new static entities detected (e.g., road signs), and/or changes in environmental conditions. The output 390 may further indicate any planned, scheduled, or currently ongoing locomotive actions by the ego vehicle 341. The logic 113 may convert the output 390 into a converted output 395 which is simplified compared to the output 390. Here, the output 390 and the converted output 395 may indicate that an oncoming vehicle (e.g., the second opposite direction vehicle 343) is approaching the ego vehicle 341, and an inferred intent of the oncoming vehicle is to overtake. The output 390 and the converted output 395 may further indicate that a planned action of the ego vehicle 341 is to pull over if the oncoming vehicle gets too close.

Additionally or alternatively, the logic 113 may generate an output and/or a converted output that includes changes in environmental conditions and/or that changes in the ego vehicle 341. For example, the output and/or the converted output may indicate changes in environmental conditions such as changes in weather, changes in visibility, and/or changes in traffic density, and resulting locomotive actions such as slowing down and/or increasing a following distance. Changes in weather may include increased or decreased precipitation (e.g., rain, snow), increases or decreases in visibility (e.g., due to darkness and/or changes in air quality), and/or increases or decreases in traffic density. In other examples, the logic 113 may generate an output and/or a converted output that includes changes in conditions of the ego vehicle 341, and any resulting locomotive actions. These changes may include changes in functionalities or capabilities of the ego vehicle 341, such as a potentially damaged sensor. The logic 113 may generate an output and a converted output indicating a potentially damaged sensor, and resulting operations such as slowing down and/or commencing operation of one or more backup sensors. The logic 113 may indicate further rationale such as the ego vehicle 341 only slowing down by a certain amount due to low traffic density and/or other contextual information.

The logic 113 may transmit the output (e.g., the output 390) and/or the converted output (e.g., the converted output 395) to one or more external entities such as other computers and/or other vehicles. In such a manner, other vehicles may be informed regarding observations of the ego vehicle 341, and/or intents of the ego vehicle 341. For example, other vehicles behind the ego vehicle 341 may not be able to perceive the approaching second opposite direction vehicle 343, but may nonetheless obtain the information of the second opposite direction vehicle 343 from the ego 341. Additionally, these other vehicles behind the ego vehicle 341 may receive a notification that the ego vehicle 341 may pull over, so that these other vehicles may also be prepared to take some locomotive action such as pulling over or slowing down. In such a manner, the transmission of the output 390 and/or the converted output 395 may increase transparency and safety among vehicles.

FIG. 4 illustrates the logic 113 generating an output indicating a planned locomotive action due to signaling and/or historical or inferred intents and/or behaviors of dynamic entities. The logic 113 may obtain the data 340 and data 440 from one or more different sources. Compared to FIG. 3, FIG. 4 illustrates clearer intents of other vehicles as a result of additional data 440. In FIG. 4, the data 440 may be supplemental to and/or correspond to one or more different frames, such as a subsequent frame, compared to the data 340. The data 440 may have same or similar entities and characteristics compared to the data 340, except that a longitudinal distance between a first opposite direction vehicle 442 and a second opposite direction vehicle 443 has decreased, compared to a longitudinal distance between the first opposite direction vehicle 342 and the second opposite direction vehicle 343 in FIG. 3. This decreased longitudinal distance may suggest or indicate that the second opposite direction vehicle 443 intends to overtake, and is in the process of overtaking, the first opposite direction vehicle 442. Compared to FIG. 3, the logic 113 may generate a clearer and more detailed output 490 and converted output 495, because of the clearer intent of the second opposite direction vehicle 443.

The data 440 may include an ego vehicle 441 on a lane 445, the first opposite direction vehicle 442 on an opposite lane 446, and the second opposite direction vehicle 443, which is facing a wrong direction, on a lane 445. The second opposite direction vehicle 443 may further include a blinking right signaling light 444. The data 440 may further include traffic signs 447 and 448, facing opposite directions, to indicate that the lane 445 and the opposite lane 446 are indeed opposite directions. The ego vehicle 441 may be implemented as the ego vehicle 341 of FIG. 3, the lane 445 may be implemented as the lane 345, the opposite lane 446 may be implemented as the opposite lane 346, the blinking right signaling light 444 may be implemented as the blinking right signaling light 344, and the traffic signs 447 and 448 may be implemented as the traffic signs 347 and 348. The first opposite direction vehicle 442 and the second opposite direction 443 vehicle may be implemented as the first opposite direction vehicle 342 and the second opposite direction vehicle 343, respectively, with a difference of a relative spacing between the first opposite direction vehicle 442 and the second opposite direction 443 being less than that between the first opposite direction vehicle 342 and the second opposite direction vehicle 343.

The logic 113 may obtain information from the different sources as described in FIG. 1, and generate an output 490 which combines the information from the different sources. Compared to the output 390, the output 490 may further indicate a clearer intent of the second opposite direction vehicle 443 intending to overtake the first opposite direction vehicle 442 and subsequently switch to the opposite lane 446. The output 490 may further indicate that the second opposite direction vehicle 443 can likely overtake the first opposite direction vehicle 442 without colliding with the ego vehicle 441. The logic 113 may convert the output 490 into a converted output 495 which is simplified compared to the output 490. The converted output 495 may further indicate a likelihood of the second opposite direction vehicle 443 to overtake the first opposite direction vehicle 442 and switch to the opposite lane 446 after overtaking.

FIG. 5 illustrates the logic 113 generating an output indicating a planned locomotive action due to signaling from dynamic entities and/or based on types, categories, or classifications (hereinafter "types") of dynamic entities, such as authority vehicles e.g., police vehicles and other emergency response vehicles), human powered devices (e.g., bicycles, scooters) motorcycles, and aerial vehicles such as helicopters for emergency deployment, pedestrians, and/or animals. Here in FIG. 5, the logic 113 may generate an output that indicates an identification of an authority vehicle in an incorrect lane which may suggest a current or impending emergency, and signify that an ego vehicle is to pull over. On the other hand, if a non-authority vehicle is in an incorrect lane, the ego vehicle may refrain from or delay pulling over. The logic 113 may communicate an inferred event, and how that impacts a locomotive action. The logic 113 may obtain data 540, which may be manifested in media, textual, and/or other applicable formats. The data 540 may include an ego vehicle 541 on a lane 545, a first opposite direction vehicle 542 on an opposite lane 546, and a second opposite direction vehicle 543, which is facing a wrong direction, on the lane 545. The second opposite direction vehicle 543 may further include a flashing emergency signaling light 544 and a beacon 549. The flashing emergency signaling light 544 and the beacon 549 may indicate an emergency or urgent situation, which may indicate to the ego vehicle 541 to yield. The flashing emergency signaling light 544 and the beacon 549 may also indicate or suggest a type of vehicle, such as an emergency vehicle and/or an authority vehicle. The data 540 may further include traffic signs 547 and 548, facing opposite directions, to indicate that the lane 545 and the opposite lane 546 are indeed opposite directions. The ego vehicle 541 may be implemented as the ego vehicle 441 of FIG. 3, the lane 545 may be implemented as the lane 345, the opposite lane 546 may be implemented as the opposite lane 346, and the traffic signs 547 and 548 may be implemented as the traffic signs 347 and 348. The first opposite direction vehicle 542 may be implemented as the first opposite direction vehicle 342.

The logic 113 may obtain information from the different sources as described in FIG. 1, and generate an output 590 which combines the information from the different sources. The output 590 may include any changes detected, including new dynamic entities (e.g., the first opposite direction vehicle 542, the second opposite direction vehicle 543, and/or any pedestrians) detected, and/or changes in attributes of existing dynamic entities, new static entities detected (e.g., road signs), and/or changes in environmental conditions. The output 590 may further indicate any planned, scheduled, or currently ongoing locomotive actions by the ego vehicle 541. The logic 113 may convert the output 590 into a converted output 595 which is simplified compared to the output 590. Here, the output 590 and the converted output 595 may indicate that an oncoming vehicle (e.g., the second opposite direction vehicle 543), which is an authority vehicle, is approaching the ego vehicle 541, and that an emergency is occurring or impending. The output 590 and the converted output 595 may further indicate that a planned action of the ego vehicle 541 is to pull over.

Figure 6:
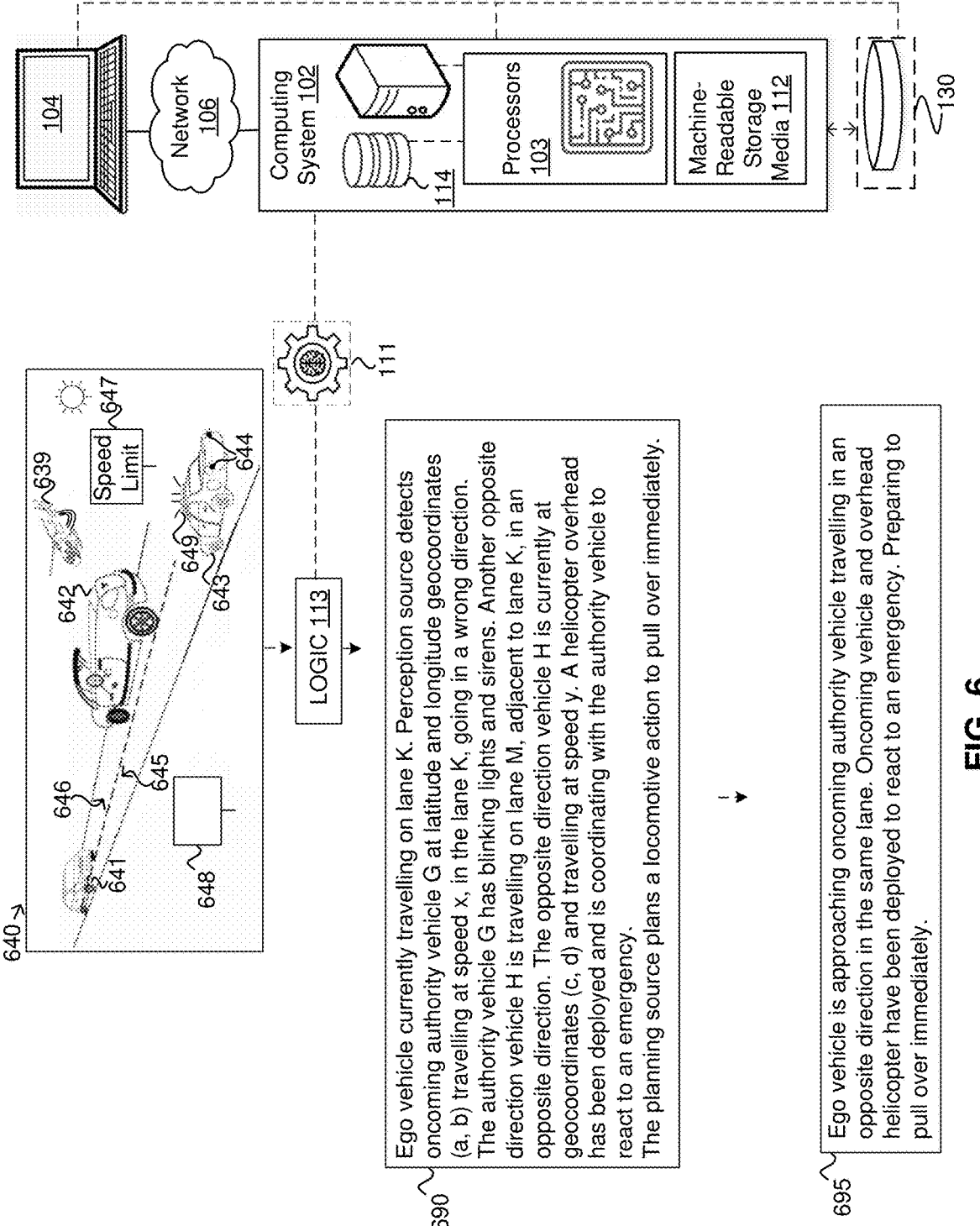

FIG. 6 illustrates the logic 113 generating an output indicating a planned locomotive action due to signaling from dynamic entities and/or based on types of dynamic entities, which may include non-terrestrial (e.g., non-land based) entities. For example, the logic 113 may generate an output that indicates an identification of an authority vehicle as well as a helicopter, which indicates a level of severity or urgency of a situation such as an emergency, and signifies that an ego vehicle is to pull over immediately. The logic 113 may obtain data 640, which may include the features and entities of the data 540 with an addition of a helicopter 639 or other aerial vehicle equipped to perform surveillance or tracking. Here, the helicopter 639 may further reinforce a concept of an emergency situation, and may increase a perceived urgency of the situation so that all road vehicles, such as an ego vehicle 641, may be programmed to pull over immediately upon recognizing the emergency situation.

In FIG. 6, the data 640 may include the ego vehicle 641 on a lane 645, a first opposite direction vehicle 642 on an opposite lane 646, and a second opposite direction vehicle 643, which is facing a wrong direction, on a lane 645. The second opposite direction vehicle 643 may further include a flashing emergency signaling light 644 and a beacon 649. The data 640 may further include traffic signs 647 and 648, facing opposite directions, to indicate that the lane 645 and the opposite lane 646 are indeed opposite directions. The ego vehicle 641 may be implemented as the ego vehicle 541 of FIG. 5, the lane 645 may be implemented as the lane 545, the opposite lane 646 may be implemented as the opposite lane 546, the flashing emergency signaling light 644 may be implemented as the flashing emergency signaling light 544, and the traffic signs 647 and 648 may be implemented as the traffic signs 547 and 548. The first opposite direction vehicle 642 and the second opposite direction 643 vehicle may be implemented as the first opposite direction vehicle 542 and the second opposite direction vehicle 543.

The logic 113 may obtain information from the different sources as described in FIG. 1, and generate an output 690 which combines the information from the different sources. The output 690 may include any changes detected, including new dynamic entities (e.g., the first opposite direction vehicle 642, the second opposite direction vehicle 643, and/or the helicopter 639) detected. The output 690 may further indicate any planned, scheduled, or currently ongoing locomotive actions by the ego vehicle 641. The logic 113 may convert the output 690 into a converted output 695 which is simplified compared to the output 690. Here, the output 690 and the converted output 695 may indicate that an oncoming vehicle (e.g., the second opposite direction vehicle 643), which is an authority vehicle, is approaching the ego vehicle 641, that a helicopter has also been deployed to address an emergency, in conjunction with the authority vehicle. The output 690 and the converted output 695 may further indicate that a planned action of the ego vehicle 641 is to pull over immediately.

FIG. 7 illustrates the logic 113 generating an output indicating a planned locomotive action due to detecting dynamic entities of certain types, which may include non-vehicular entities such as pedestrians and/or animals. For example, the logic 113 may generate an output that indicates an identification of a pedestrian, and signify that an ego vehicle is to pull over or otherwise move away from a trajectory or planned trajectory of the pedestrian.

The logic 113 may obtain data 740, which may include the features and entities of the data 340 with an addition of a pedestrian 749. In FIG. 7, the data 740 may include the ego vehicle 741 on a lane 745, a first opposite direction vehicle 742 on an opposite lane 746, and a second opposite direction vehicle 743, which is facing a wrong direction, on the lane 745. The second opposite direction vehicle 743 may further include a blinking right signaling light 744. The data may further include traffic signs 747 and 748, facing opposite directions, to indicate that the lane 745 and the opposite lane 746 are indeed opposite directions. The ego vehicle 741 may be implemented as the ego vehicle 341 of FIG. 3, the lane 745 may be implemented as the lane 345, the opposite lane 746 may be implemented as the opposite lane 346, and the traffic signs 747 and 748 may be implemented as the traffic signs 347 and 348. The first opposite direction vehicle 742 may be implemented as the first opposite direction vehicle

342. The second opposite direction vehicle 743 may be implemented as the second opposite direction vehicle 343.

The logic 113 may obtain information from the different sources as described in FIG. 1, and generate an output 790 which combines the information from the different sources. The output 790 may include any changes detected, including new dynamic entities (e.g., the first opposite direction vehicle 742, the second opposite direction vehicle 743, and/or the helicopter 739) detected. The output 790 may further indicate any planned, scheduled, or currently ongoing locomotive actions by the ego vehicle 741. The logic 113 may convert the output 790 into a converted output 795 which is simplified compared to the output 790. Here, the output 790 and the converted output 795 may indicate that a pedestrian has unexpectedly walked onto a non-designated walking area and that the ego vehicle 741 is preparing to yield. In some examples, in a situation with multiple detections and/or multiple events, the logic 113 may remove or deemphasize a less urgent or less imminent detection or event when converting the output 790 into the converted output 795. For example, in FIG. 7, the less imminent detection or event would correspond to the second opposite direction vehicle 743, and the more imminent detection or event would correspond to the pedestrian 749.

Figure 8A:
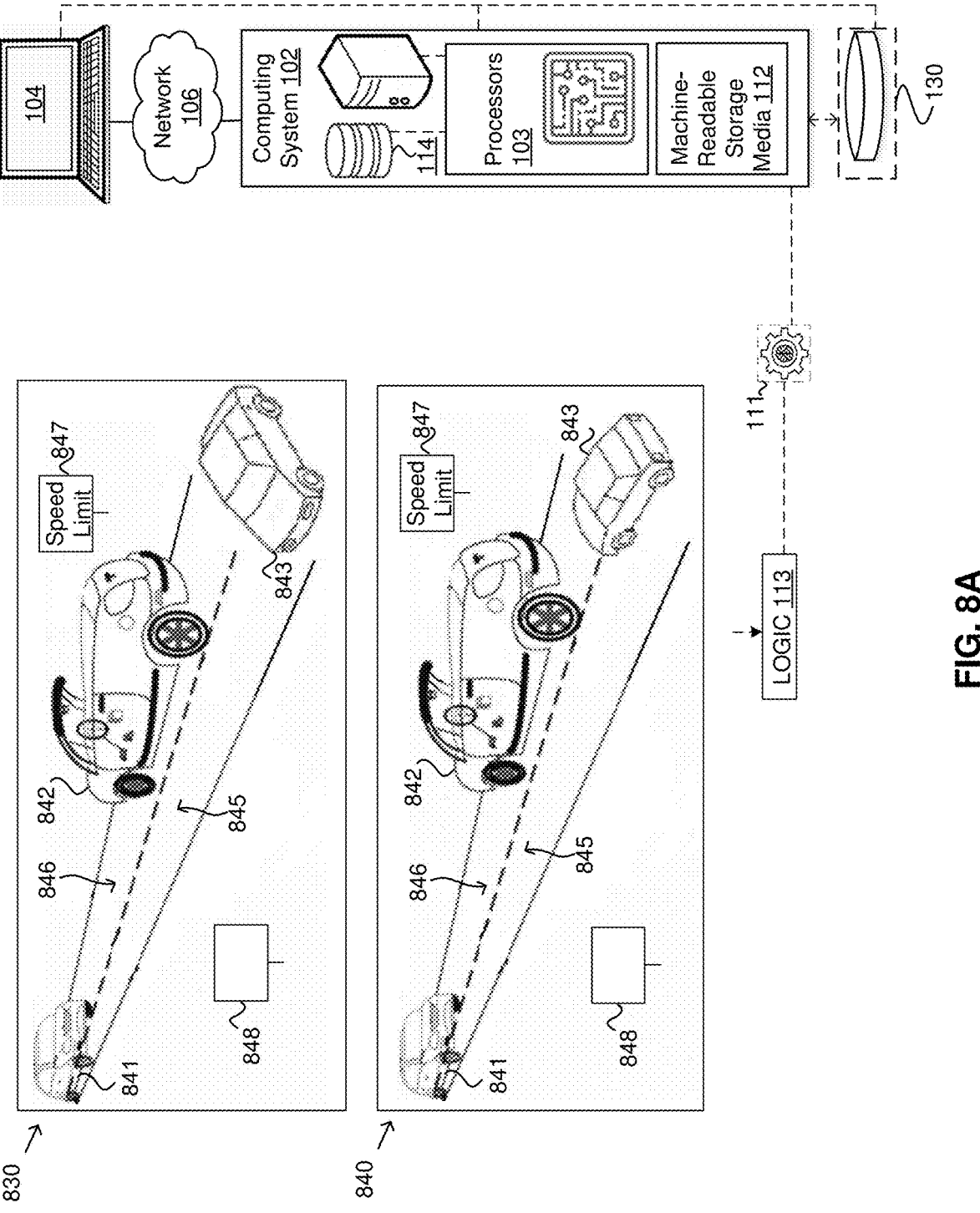

FIGS. 8A-8B illustrate the logic 113 generating an output indicating a planned locomotive action due to dynamic entity behaviors, including abnormal and/or unpredictable behaviors such as swerving. Such behaviors may apply to vehicular entities and non-vehicular entities. Such a scenario is useful for simulation in order to identify, avoid, and/or mitigate potential dangers which may arise from these behaviors. Other such exemplary behaviors may include tailgating or forming a roadblock (e.g., two vehicles such as trucks driving side by side over a prolonged period of time).

The logic 113 may obtain data 830 and 840. The data 830 and 840 may encompass multiple frames and/or datasets. In FIG. 8A, the data 830 may include an ego vehicle 841 on a lane 845, a first opposite direction vehicle 842 on an opposite lane 846, and a second opposite direction vehicle 843, which is facing a wrong direction, on the lane 845. The second opposite direction vehicle 843 may be oriented non-parallel with respect to the first opposite direction vehicle 842 and/or the ego vehicle 841. The data 830 may further include traffic signs 847 and 848, facing opposite directions, to indicate that the lane 845 and the opposite lane 846 are indeed opposite directions. The ego vehicle 841 may be implemented as the ego vehicle 341 of FIG. 3, the lane 845 may be implemented as the lane 345, the opposite lane 846 may be implemented as the opposite lane 846, and the traffic signs 847 and 848 may be implemented as the traffic signs 347 and 348. The first opposite direction vehicle 842 may be implemented as the first opposite direction vehicle 342.

Meanwhile, the data 840 may include the same entities as in the data 830, but an absolute and/or relative orientation and/or a position of the second opposite direction vehicle 843 may have changed from that in the data 830. The positioning of the second opposite direction vehicle 843 being non-parallel with either the lane 845 or the opposite lane 846, and the change in the relative orientation of the second opposite direction vehicle 843, may indicate or suggest a swerving behavior.

The logic 113 may obtain information from the different sources as described in FIG. 1, and generate an output 890 which combines the information from the different sources. The output 890 may include any changes detected, including behaviors of entities (e.g., the second opposite direction vehicle 843 swerving). The output 890 may further indicate any planned, scheduled, or currently ongoing locomotive actions by the ego vehicle 841. The logic 113 may convert the output 890 into a converted output 895 which is simplified compared to the output 890. Here, the output 890 and the converted output 895 may indicate that a vehicle approaching from an opposite direction is swerving and that the ego vehicle 841 is preparing to yield or pull over.

FIG. 9 illustrates the logic 113 generating an output indicating a planned locomotive action due to a potential inferred danger. The danger may be inferred from a presence and/or an absence of other features such as equipment, tools, instruments, devices, accessories and/or other additions (hereinafter "equipment") attached to or associated with one or more dynamic entities. For example, the logic 113 may generate an output indicating that a first vehicle has snow chains while a second vehicle lacks snow chains in snowy conditions and that a following distance to the second vehicle should be increased due to possible increased danger of slippage of the second vehicle.

In FIG. 9, the logic 113 may obtain data 940. The data 940 may include an ego vehicle 941 on a lane 945, a first same direction vehicle 942 on a lane 946, and a second same direction vehicle 943 on the lane 945. The first same direction vehicle 942 may include snow chains 949, while the second same direction vehicle 943 may not include the snow chains 949. The ego vehicle 941 may also include snow chains. The data 940 may further include a traffic sign 947.

The logic 113 may obtain information from the different sources as described in FIG. 1, and generate an output 990 which combines the information from the different sources. The output 990 may include any possible dangers detected, including the second same direction vehicle 943 driving without the snow chains 949. The output 990 may further indicate any planned, scheduled, or currently ongoing locomotive actions by the ego vehicle 941. The logic 113 may convert the output 990 into a converted output 995 which is simplified compared to the output 990. Here, the output 990 and the converted output 995 may indicate that a vehicle ahead lacks snow chains and that the ego vehicle 941 is planning to increase a following distance due to increased danger of slip.

FIG. 10 illustrates the logic 113 generating an output indicating a planned locomotive action due to a potential inferred danger. The danger may be inferred from a presence and/or an absence of other features such as a load carried by or associated with a dynamic entity. For example, if a vehicle is carrying a load attached to the vehicle, such as within a bed, and the bed is open, then the load may fall out of the bed which would trigger a hazard.

In FIG. 10, the logic 113 may obtain data 1040. The data 1040 may include an ego vehicle 1041 on a lane 1045, and a same direction vehicle 1042 on the lane 1045. The same direction vehicle 1042 may include a load 1043 within a bed, cargo, compartment, or a back portion (hereinafter "bed") 1044. The data 1040 may further include a traffic sign 1047.

The logic 113 may obtain information from the different sources as described in FIG. 1, and generate an output 1090 which combines the information from the different sources. The output 1090 may include any possible dangers detected, including a possibility of the load 1043 falling out of the open bed 1044 of the same direction vehicle 1042. The output 1090 may further indicate any planned, scheduled, or currently ongoing locomotive actions by the ego vehicle 1041, such as increasing a following distance. The logic 113 may convert the output 1090 into a converted output 1095 which is simplified compared to the output 1090. Here, the output 1090 and the converted output 1095 may indicate that a vehicle ahead is carrying a load within an open bed and that the load may fall out, so the ego vehicle 1041 is increasing a following distance.

FIG. 11 illustrates the logic 113 generating an output indicating a planned locomotive action corresponding to a road geometry, arrangement, layout, or organization (hereinafter "geometry") such as an uncontrolled intersection. For example, the uncontrolled intersection may have obstacles including opposite direction vehicles and pedestrians.

In FIG. 11, the logic 113 may obtain data 1140. The data 1140 may include an ego vehicle 1141 on a lane 1143 and an opposite direction vehicle 1142 with a blinking left turn signal 1147 and traveling on an opposite lane 1144 that is in an opposite direction or orientation compared to the lane 1143. A pedestrian 1149 may be crossing in front of the opposite direction vehicle 1142. The lane 1143 may include a lane marking 1153. The opposite lane 1144 may include an opposite lane marking 1154. A lane 1145 may be orthogonal to the lane 1143 and the opposite lane 1144. The lane 1145 may include a lane marking 1155. An opposite lane 1146 may be in an opposite direction or opposite orientation relative to the lane 1145. The opposite lane 1146 may include an opposite lane marking 1156.

The logic 113 may obtain information from the different sources as described in FIG. 1, and generate an output 1190 which combines the information from the different sources. The output 1190 may include an indication of an approaching uncontrolled intersection, that the opposite direction vehicle 1142 is signaling to turn onto a planned path of the ego vehicle 1141, and that the pedestrian 1149 is predicted to cross into the planned path of the ego vehicle 1141. The output may further indicate that the ego vehicle 1141 is planning to stop prior to a predicted trajectory of the pedestrian 1149. The logic 113 may convert the output 1190 into a converted output 1195 which is simplified compared to the output 1190.

Figure 12A:
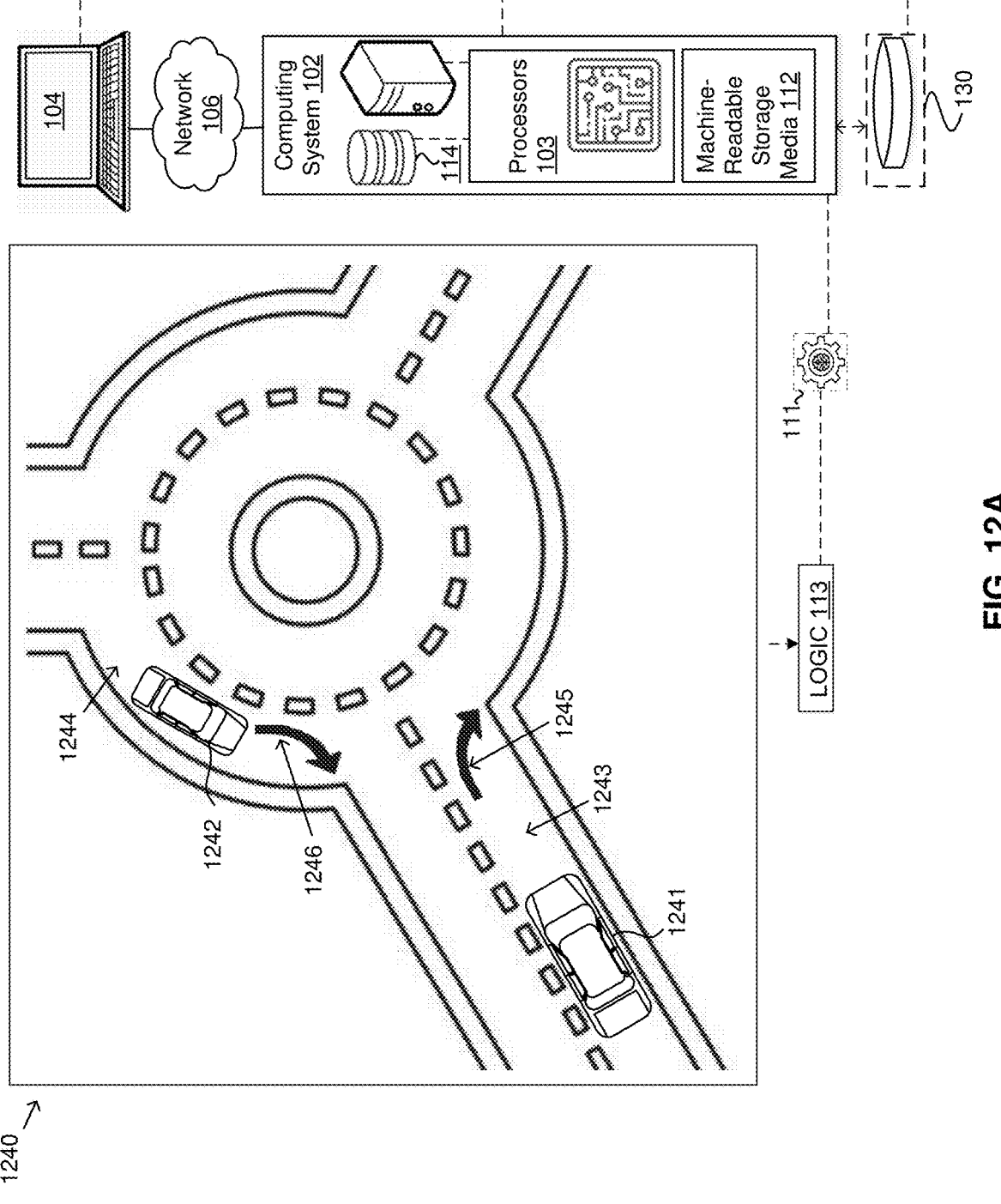

FIGS. 12A and 12B illustrates the logic 113 generating an output indicating a planned locomotive action corresponding to a road geometry such as a roundabout. In FIG. 12A, the logic 113 may obtain data 1240. The data 1240 includes an ego vehicle 1241 on a lane 1243, a vehicle 1242 inside the roundabout on lane 1244, a marking 1245 indicating a permitted turn direction, and a marking 1246 indicating a permitted turn direction.

The logic 113 may obtain information from the different sources as described in FIG. 1, and generate an output 1290 which combines the information from the different sources. The output 1290 may include an indication of an approaching roundabout, and indicate that the ego vehicle 1241 is planning to yield to the opposite direction vehicle 1242. The logic 113 may convert the output 1290 into a converted output 1295 which is simplified compared to the output 1290.

Figure 13:
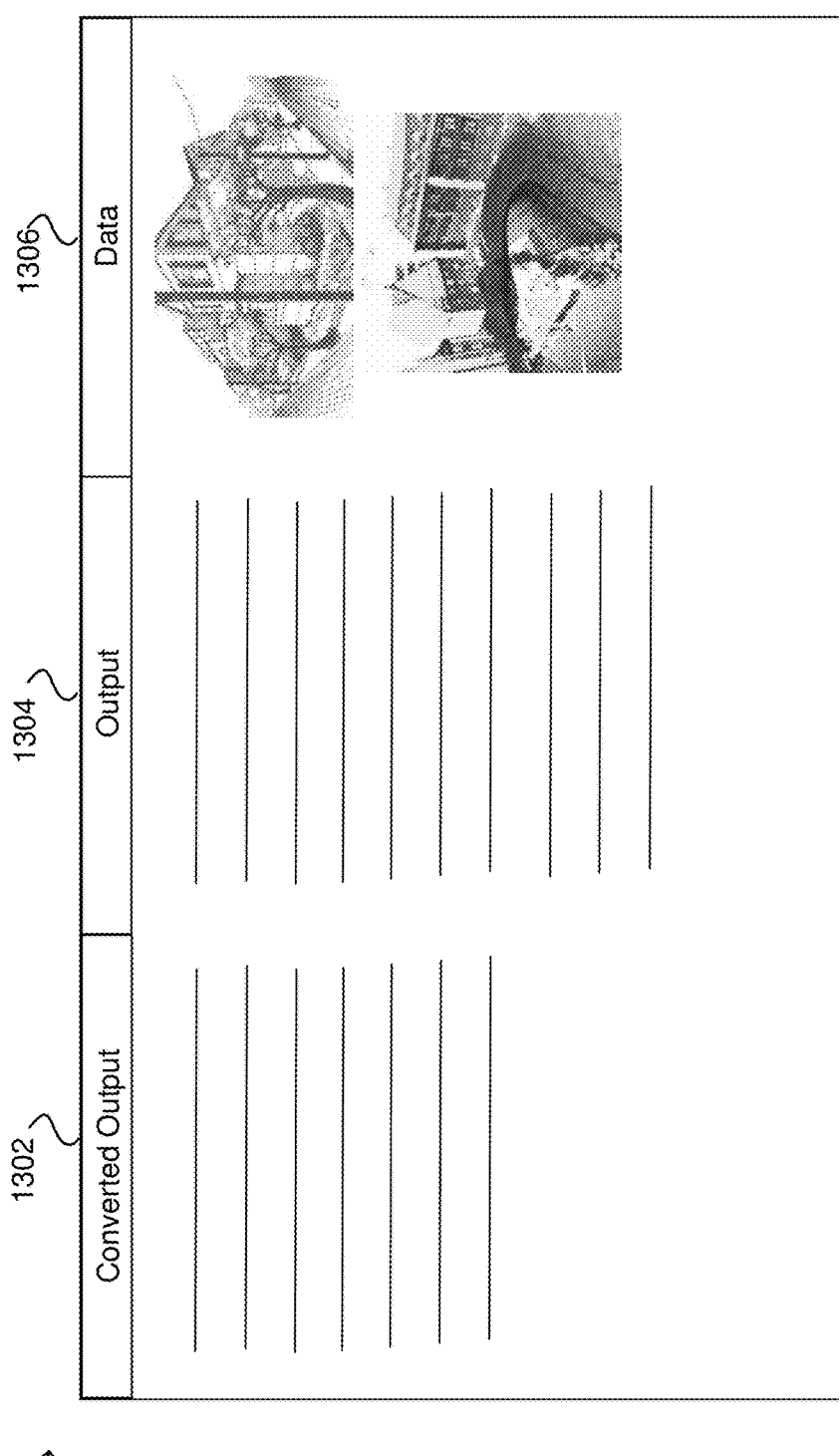
FIG. 13 illustrates an implementation of an example interface through which outputs, converted outputs, and contextual data may be retrieved and/or presented.

FIG. 13 illustrates an interface or window (hereinafter "interface") 1300, such as a display interface or a graphical user interface (GUI) through which converted outputs, generated outputs, and/or data may be retrieved and/or presented. The interface 1300 may be presented on an HMI, such as the computing device 104. The interface 1300 may be generated by the logic 113 and may contain columns, tabs, and/or menus (hereinafter "columns") such as a converted output column 1302, an output column 1304, and a data column 1306. In some examples, the columns may be customized. For example, only one or two of the aforementioned columns may take up an entirety of the interface

1300, and some of the columns may be removed. Here, the converted output column 1302 may display a converted output (e.g., any of the converted outputs 195, 395, 495, 595, 695, 795, 895, 995, 1095, 1195, and/or 1295). The output column 1304 may display a generated output (e.g., any of the generated outputs 190, 390, 490, 590, 690, 790, 890, 990, 1090, 1190, and/or 1290). Meanwhile, the data column 1306 may display any contextual information (e.g., any of the data 340, 440, 540, 640, 740, 830, 840, 940, 1040, 1140, and/or 1240) associated with the output 1304 and/or the converted output 1302, including relevant data from any of the sources as described in FIG. 1.

Figure 14:
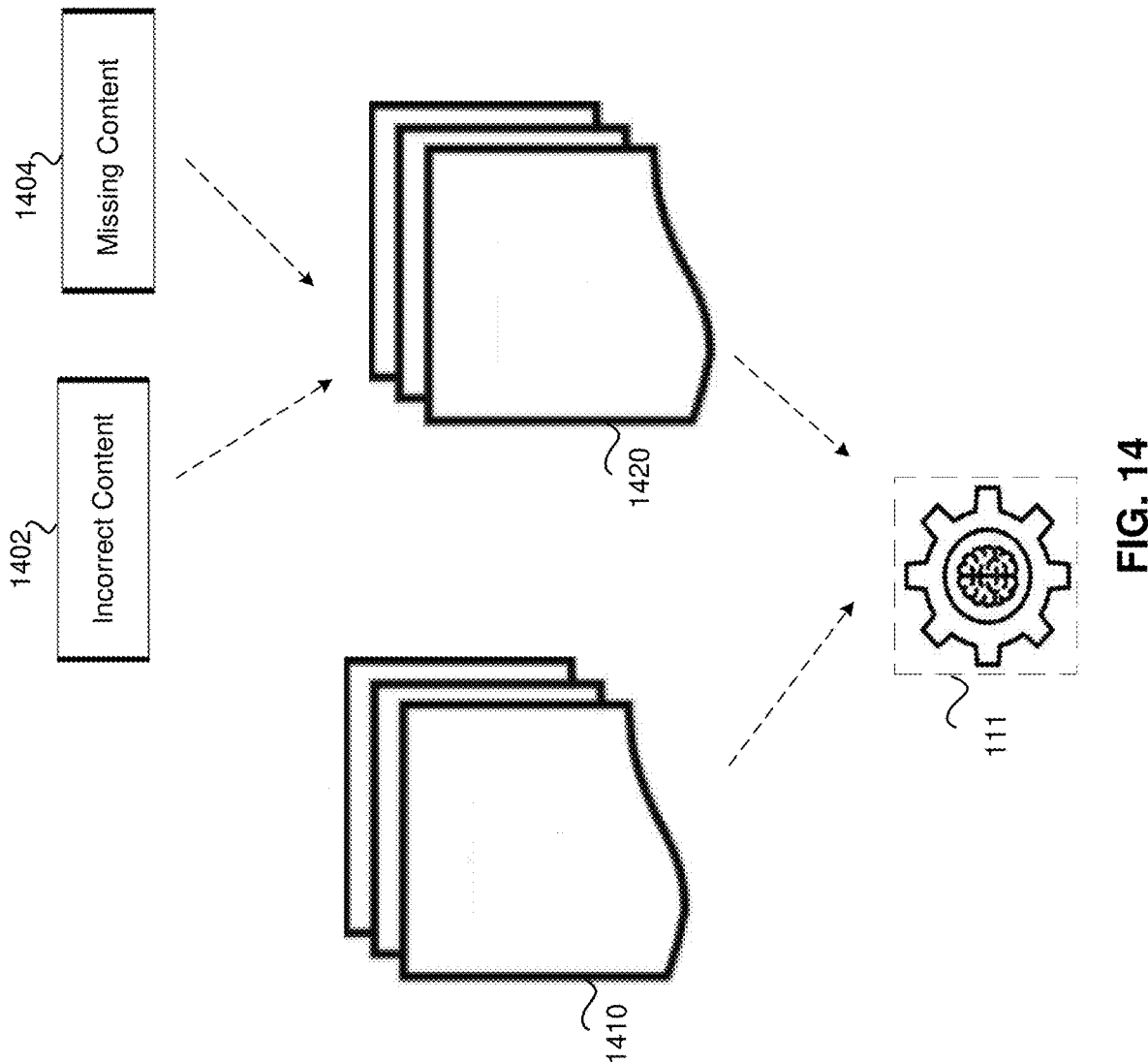
FIG. 14 illustrates example implementations of training of machine learning components to infer characterizations of scenarios, and to perform other functions.

FIG. 14 describes an iterative and/or sequential training process of the machine learning components 111, which may be continuously trained to perform any of the functions described above, including generating the outputs and/or converting the outputs into converted outputs. For example, as new driving data is obtained, the machine learning components 111 may be continuously trained. The training may be performed in part by the computing system 102 and/or by a different computing system. For example, the machine learning components 111 may be initially trained using a first training dataset 1410, and subsequently trained using a second training dataset 1420. The first training dataset 1410 may include examples of appropriate outputs generated from contextual information, and/or appropriate converted outputs that were converted from the outputs. The first training dataset 1410 may additionally include inappropriate outputs and/or inappropriate converted outputs, so that after training, the machine learning components 111 may be programmed to avoid pitfalls. The second training dataset 1420 may include compiled examples, which may encompass, or be generated based on, incorrectly generated outputs and/or incorrectly converted outputs by the machine learning components 111. The compiled examples may be corrected based on the incorrectly characterized scenarios. For example, training using the second training dataset 1420 may occur following a set of inferences which were made at least partially incorrectly by the machine learning components 111. Such incorrect inferences may be attributed to any of incorrect recognition and/or incorrect translation or processing of data such as media or text, incorrectly weighing of criteria, and/or incorrect assumptions. The second training dataset 1420 may include and/or be generated based on corrections from examples 1402 and 1404. The examples 1402 may encompass incorrectly inferred outputs, which may include false positive outputs. For instance, the examples 1402 may include outputs of an existence of an entity, condition, or action (e.g., overtaking, turning) that do not actually exist or did not happen, and/or that was unsupported by the contextual information. The examples 1402 may additionally or alternatively include improperly converted outputs when the generated outputs were proper, such as the converted outputs including information that was missing from the generated outputs. Meanwhile, the examples 1404 may encompass those having missing outputs, which may include false negative characterizations. For instance, the examples 1404 may have missed an output of an entity, condition, or action that actually occurred (e.g., a pedestrian or other entity that was undetected, and/or unaccounted for) and was relevant or important to the locomotive action. The examples 1402 may additionally or alternatively include improperly converted outputs when the generated outputs were proper, such as the converted outputs excluding relevant and/or important information that was present in the generated outputs.

Figure 15:
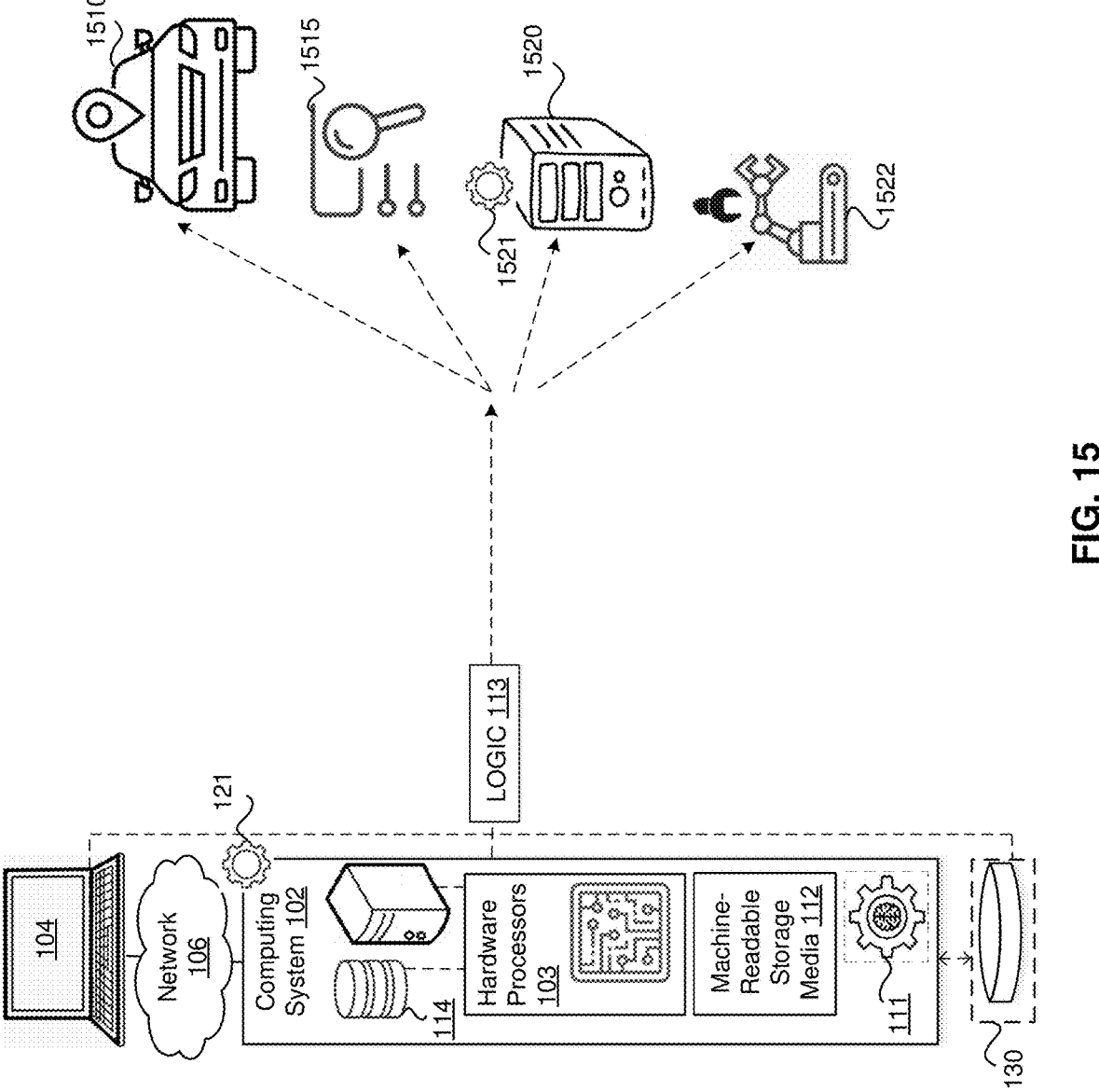
FIG. 15 illustrates an example implementation of downstream actions or processes.

FIG. 15 illustrates downstream actions, as part of a workflow or a process, which may occur prior to, concurrent with, or following the generating of the outputs and/or the converting of the outputs. The computing system 102 and/or a different computing system may implement a locomotive action based on the generated outputs and/or the converted outputs. The generating of the outputs may encompass monitoring one or more results, statistics and attributes of the vehicle during the locomotive action. The results may indicate occurrences that followed (e.g., disengagement, accident, safe maneuvering). The statistics may include, monitoring crash rate distributions, crash type distributions, severity distributions, post-encroachment time distributions, and/or near-miss distributions.

In yet other examples, any of the outputs and/or converted outputs may be validated by the computing system 102 and/or by a different computing system 1520. The validation may include analyzing to determine whether the locomotive action was an appropriate action and/or whether other alternatives would have led to better results (e.g., more energy, time, and/or resource savings, increased safety to the ego vehicle and/or other entities). If other alternatives would have led to better results, the computing system 102 may be reprogrammed according to the other alternatives so that in similar or same circumstances the computing system 102 would implement the other alternatives, and generate an output indicating so. The validating may, additionally or alternatively, include determining a relevance and/or an importance of the contextual data to the locomotive action. For example, if other contextual data was relevant and/or important but missed or ignored in the determination of the locomotive action, then the computing system 102 may be reprogrammed accordingly.

Specifically, downstream actions may encompass performing navigation 1510, additional monitoring 1515, transmitting and/or writing information to a different computing system 1520, for example, via an API 1521, and/or maintenance or other physical operations 1522 such as adjusting a physical or electronic infrastructure or components of a vehicle (e.g., ego vehicle) in order to better react to certain safety conditions.

As an example of the additional monitoring 1515, the computing system 102 and/or a different computing system may monitor the aforementioned statistics and vehicle parameters such as engine operation parameters (e.g., engine rotation rate), moment of inertia, and/or position of center of gravity, to ensure safe operation of a vehicle, in particular, to verify whether attributes or parameters of a vehicle fall within certain operating ranges or thresholds. In some examples, the additional monitoring 1515 may occur in response to certain attributes or parameters falling outside of certain operating ranges or thresholds. This monitoring or recording of other entity types may be performed by the computing system 102, or may be delegated to a different processor. In other examples, a downstream action may include the writing of information 1520. Such writing of information may encompass transmission or presentation of information, an alert, and/or a notification to the computing device 104 and/or to other devices. The information may include indications of which attributes or parameters of a vehicle may fall outside of operating ranges or thresholds, or reasons that an alert was triggered, and/or one or more timestamps corresponding to an originating or creation time of underlying data that caused the triggering of the alert. Alternatively, an alert may be triggered using a predicted time at which an attribute or parameter may be predicted to fall outside of an operating range or threshold.

In other examples, a downstream action may entail an applications programming interface (API) 121 of the computing system 102 interfacing with or calling the API 1521 of the different computing system 1520. For example, the different computing system 1520 may perform analysis and/or transformation or modification of data, through some electronic or physical operation. Meanwhile, the physical operations 1522 may include controlling braking, steering, and/or throttle components to effectuate a throttle response, a braking action, and/or a steering action during navigation.

Figure 16:
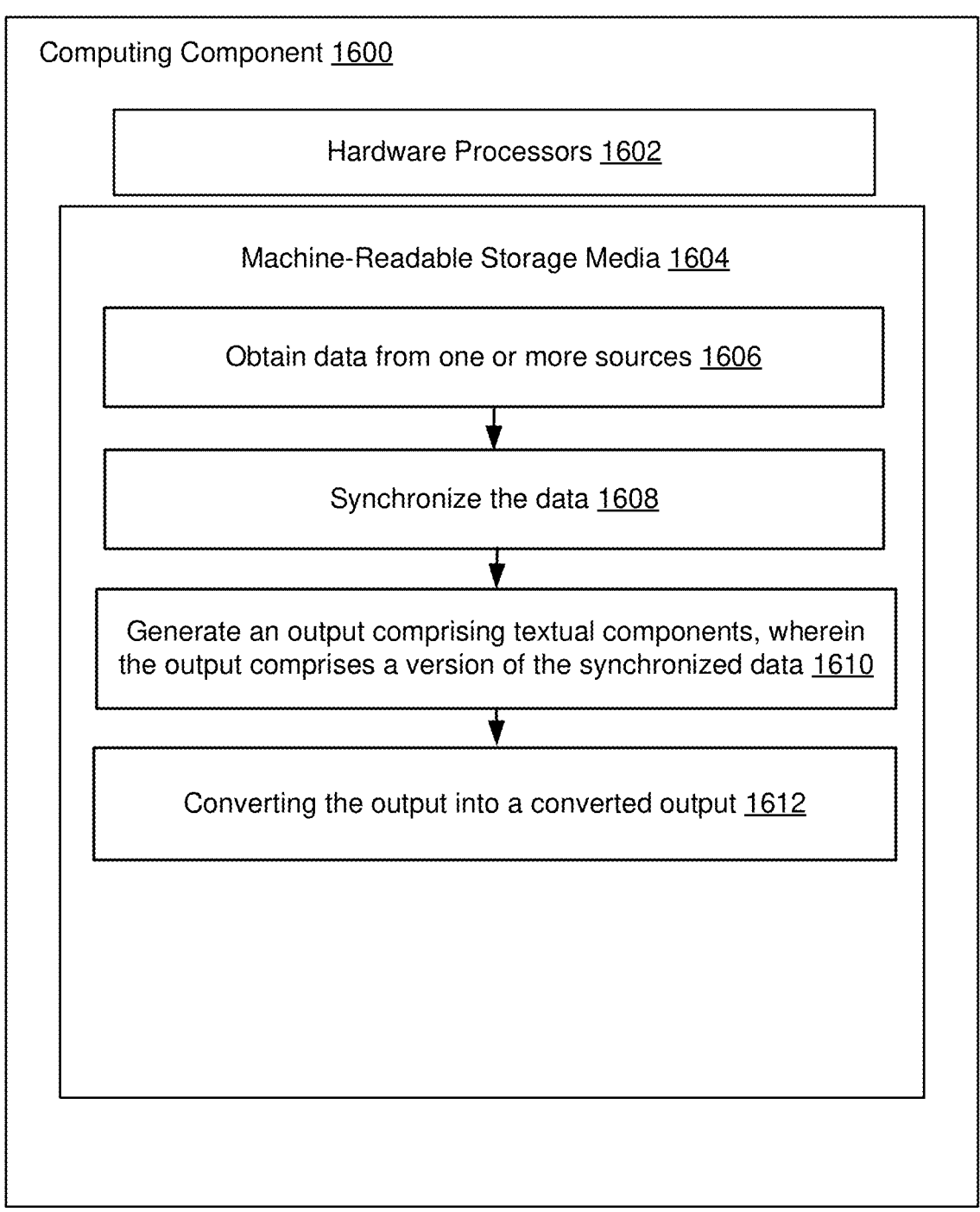
FIG. 16 illustrates a flowchart which summarizes an exemplary process to process data, generate an output from the processed data, and convert the output into a converted output.

FIG. 16 illustrates a computing component 1600 that includes one or more hardware or other processors 1602 and machine-readable storage media 1604 storing a set of machine-readable/machine-executable instructions that, when executed, cause the processor(s) 1602 to perform an illustrative method of generating an output and converting the generated output into a converted output. The computing component 1600 may be implemented as the computing system 102 of FIG. 1. The processors 1602 may be implemented as the processors 103. The machine-readable storage media 1604 may be implemented as the machine-readable storage media 112, and may include suitable machine-readable storage media described in FIG. 17.

At step 1606, the processors 1602 may execute machine-readable/machine-executable instructions stored in the machine-readable storage media 1604 to obtain data (e.g., any of the data 340, 440, 540, 640, 740, 830, 840, 940, 1040, 1140, and/or 1240) from one or more sources (e.g., the control source 180, the planning source 160, the prediction source 150, the localization source 190). In some examples, the data may include sensor data. The data may be directly obtained, for example, from a storage (e.g., the database 130 of the computing system 102) or from an external source. Alternatively, the data may be generated from raw data, such as fusing raw sensor data from sensors of different modalities. The data may include an ongoing or planned locomotive action and contextual information associated with the locomotive action, which may have triggered, caused, or affected the ongoing or planned locomotive action.

At step 1608, the processors 1602 may execute machine-readable/machine-executable instructions stored in the machine-readable storage media 1604 to synchronize the data. Synchronizing the data may encompass normalizing and/or standardizing the data from different sources which originally have different native formats into one or more common formats in order to read and/or interpret the data.

At step 1610, the processors 1602 may execute machine-readable/machine-executable instructions stored in the machine-readable storage media 1604 to generate an output (e.g., any of the generated outputs 190, 390, 490, 590, 690, 790, 890, 990, 1090, 1190, and/or 1290) comprising textual components. The output may include a compiled version of the synchronized data.

At step 1610, the processors 1602 may execute machine-readable/machine-executable instructions stored in the machine-readable storage media 1604 to convert the output into a converted output (e.g., any of the converted outputs 195, 395, 495, 595, 695, 795, 895, 995, 1095, 1195, and/or 1295). The converted output may include a condensed version of the output.

The techniques described herein, for example, are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination.

Figure 17:
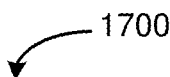
FIG. 17 illustrates a block diagram of a computer system upon which any of the embodiments described herein may be implemented.

FIG. 17 illustrates a block diagram of a computer system 1700 upon which any of the embodiments described herein may be implemented. The computer system 1700 includes a bus 1702 or other communication mechanism for communicating information, one or more hardware or other processors, such as cloud processors, 1704 coupled with bus 1702 for processing information. A description that a device performs a task is intended to mean that one or more of the processor(s) 1704 performs.

The computer system 1700 also includes a main memory 1706, such as a random access memory (RAM), cache and/or other dynamic storage devices, coupled to bus 1702 for storing information and instructions to be executed by processor 1704. Main memory 1706 also may be used for storing temporary variables or other intermediate information during execution of instructions to be executed by processor 1704. Such instructions, when stored in storage media accessible to processor 1704, render computer system 1700 into a special-purpose machine that is customized to perform the operations specified in the instructions.

The computer system 1700 further includes a read only memory (ROM) 1708 or other static storage device coupled to bus 1702 for storing static information and instructions for processor 1704. A storage device 1710, such as a magnetic disk, optical disk, or USB thumb drive (Flash drive), etc., is provided and coupled to bus 1702 for storing information and instructions.

The computer system 1700 may be coupled via bus 1702 to output device(s) 1712, such as a cathode ray tube (CRT) or LCD display (or touch screen), for displaying information to a computer user. Input device(s) 1714, including alphanumeric and other keys, are coupled to bus 1702 for communicating information and command selections to processor 1704. Another type of user input device is cursor control 1716. The computer system 1700 also includes a communication interface 1718 coupled to bus 1702.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances.

Furthermore, the particular features, structures, or characteristics may be combined in any suitable manner in one or more embodiment.

A component being implemented as another component may be construed as the component being operated in a same or similar manner as the another component, and/or comprising same or similar features, characteristics, and parameters as the another component.

The invention claimed is:

1. A system comprising:
one or more processors; and
a memory storing instructions that, when executed by the one or more processors, cause the system to perform:
    obtaining data from one or more sources, wherein the data comprises or identifies an ongoing or planned locomotive action and contextual information associated with the locomotive action,
    synchronizing the data, wherein synchronizing the data comprises inferring one or more intents associated with the vehicle or the ongoing or planned locomotive action based on the contextual information, the contextual information comprising a type of vehicle associated with the ongoing or planned locomotive action and a relative orientation of the vehicle with respect to other occupants;
    generating an output comprising textual components, wherein the output comprises a version of the synchronized data; and
    converting the output into a converted output, wherein the converted output comprises a condensed version of the output.

2. The system of claim 1, wherein the contextual information comprises an event or a stimulus that triggered the ongoing or planned locomotive action.

3. The system of claim 1, wherein the contextual information comprises information of an external entity that is external to the system, an internal component that is internal to the system, or a change of an environmental condition.

4. The system of claim 3, wherein the contextual information comprises information regarding a potential malfunction of the internal component; and the data comprises a planned locomotive action indicating to reduce a speed or to stop.

5. The system of claim 1, wherein the contextual information comprises information from a perception model, a planning model, a prediction model, a localization model, or a control model.

6. The system of claim 1, wherein the instructions further cause the system to perform:
    executing the planned locomotive action; and
    monitoring one or more attributes of the system during the executing of the locomotive action.

7. The system of claim 1, wherein the converting of the output comprises selectively removing portions of the generated output based on respective priorities.

8. The system of claim 1, wherein the obtaining of the data comprises obtaining packets from the one or more sources, the synchronizing of the data comprises synchronizing respective payloads of the packets, and the generating of the output comprises generating a new packet having the output within a payload of the new packet.

9. The system of claim 1, wherein the obtaining of the data comprises obtaining fused sensor data from different sensor modalities.

10. The system of claim 1, wherein the converting of the output is performed by a machine learning component, the machine learning component comprising a large language model (LLM).

11. The system of claim 1, wherein the planned locomotive action is based on signaling of an external entity, and an inferred intent of the external entity.

12. The system of claim 1, wherein the planned locomotive action is based on a presence of an external entity, the external entity including a non-terrestrial entity.

13. The system of claim 1, wherein the planned locomotive action is based on a presence of a non-vehicular entity.

14. The system of claim 1, wherein the planned locomotive action is based on a behavior or a predicted behavior of an external entity.

15. The system of claim 1, wherein the planned locomotive action is based on a presence or an absence of equipment or accessories attached to an external entity.

16. The system of claim 1, wherein the planned locomotive action is based on a road geometry.

17. The system of claim 1, wherein the contextual information identifies whether the type of the vehicle is an authority vehicle, and the relative orientation of the vehicle identifies whether the vehicle is travelling along an intended direction of travel.

18. A method comprising:
    obtaining data from one or more sources, wherein the data comprises or identifies an ongoing or planned locomotive action and contextual information associated with the locomotive action,
    synchronizing the data, wherein synchronizing the data comprises inferring one or more intents associated with the vehicle or the ongoing or planned locomotive action based on the contextual information, the contextual information comprising a type of vehicle associated with the ongoing or planned locomotive action and a relative orientation of the vehicle with respect to other occupants;
    generating an output comprising textual components, wherein the output comprises a version of the synchronized data; and
    converting the output into a converted output, wherein the converted output comprises a condensed version of the output.

19. The method of claim 18, wherein the contextual information comprises an event or a stimulus that triggered the ongoing or planned locomotive action.

20. The method of claim 19, wherein the contextual information comprises information regarding a potential malfunction of the internal component; and the data comprises a planned locomotive action indicating to reduce a speed or to stop.

* * * * *